United States Patent
Lavoie

(10) Patent No.: US 10,017,115 B2
(45) Date of Patent: Jul. 10, 2018

(54) TRAILER MONITORING SYSTEM AND METHOD

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 132 days.

(21) Appl. No.: 14/938,032

(22) Filed: Nov. 11, 2015

(65) Prior Publication Data

US 2017/0129403 A1    May 11, 2017

(51) Int. Cl.
  *B60R 11/04*   (2006.01)
  *B60R 1/00*    (2006.01)
  *B62D 15/02*   (2006.01)
  *B62D 13/06*   (2006.01)

(52) U.S. Cl.
  CPC .............. *B60R 1/00* (2013.01); *B60R 11/04* (2013.01); *B62D 13/06* (2013.01); *B62D 15/027* (2013.01); *B62D 15/0285* (2013.01); *B60R 2300/806* (2013.01)

(58) Field of Classification Search
  None
  See application file for complete search history.

(56) References Cited

U.S. PATENT DOCUMENTS

| | | | |
|---|---|---|---|
| 3,542,390 A | 11/1970 | Fikes et al. | |
| 3,605,088 A | 9/1971 | Savelli | |
| 3,787,077 A | 1/1974 | Sanders | |
| 3,833,928 A | 9/1974 | Gavit et al. | |
| 3,860,257 A | 1/1975 | Mesley | |
| 4,040,006 A | 8/1977 | Kimmel | |
| 4,042,132 A | 8/1977 | Bohman et al. | |
| 4,122,390 A | 10/1978 | Kollitz et al. | |
| 4,212,483 A | 7/1980 | Howard | |

(Continued)

FOREIGN PATENT DOCUMENTS

| CN | 102582686 B | 9/2013 |
|---|---|---|
| DE | 3923676 A1 | 1/1991 |

(Continued)

OTHER PUBLICATIONS

"Ford Super Duty: Truck Technologies", Brochure, Sep. 2011, 2 pages.

(Continued)

*Primary Examiner* — Kevin McInnish
(74) *Attorney, Agent, or Firm* — Frank MacKenzie; Price Heneveld LLP

(57) ABSTRACT

A trailer monitoring system is provided herein. The system includes an imager configured to image a scene rearward of a vehicle and containing a target disposed on a trailer attached to the vehicle. The imager is configured separate the images into a first portion and a second portion. A display is configured to display the first portion of images. A controller is configured to analyze the second portion of images, adjust an image capture setting of the imager based on a status input, and modify each image in the second portion to increase the size of the imaged target relative to the total size of the captured image to determine at least one trailer related information.

20 Claims, 12 Drawing Sheets

(56) References Cited

U.S. PATENT DOCUMENTS

| | | | |
|---|---|---|---|
| 4,366,966 | A | 1/1983 | Ratsko et al. |
| 4,735,432 | A | 4/1988 | Brown |
| 4,752,080 | A | 6/1988 | Rogers |
| 4,848,449 | A | 7/1989 | Martinet et al. |
| 4,852,901 | A | 8/1989 | Beasley et al. |
| 4,943,080 | A | 7/1990 | Reimer |
| 5,001,639 | A | 3/1991 | Breen |
| 5,056,905 | A | 10/1991 | Jensen |
| 5,097,250 | A | 3/1992 | Hernandez |
| 5,108,123 | A | 4/1992 | Rubenzik |
| 5,108,158 | A | 4/1992 | Breen |
| 5,132,851 | A | 7/1992 | Bomar et al. |
| 5,152,544 | A | 10/1992 | Dierker, Jr. et al. |
| 5,191,328 | A | 3/1993 | Nelson |
| 5,244,226 | A | 9/1993 | Bergh |
| 5,246,242 | A | 9/1993 | Penzotti |
| 5,247,442 | A | 9/1993 | Kendall |
| 5,282,641 | A | 2/1994 | McLaughlin |
| 5,289,892 | A | 3/1994 | Notsu |
| 5,290,057 | A | 3/1994 | Pellerito |
| 5,455,557 | A | 10/1995 | Noll et al. |
| 5,521,633 | A | 5/1996 | Nakajima et al. |
| 5,523,947 | A | 6/1996 | Breen |
| 5,541,778 | A | 7/1996 | DeFlorio |
| 5,558,350 | A | 9/1996 | Kimbrough et al. |
| 5,559,696 | A | 9/1996 | Borenstein |
| 5,579,228 | A | 11/1996 | Kimbrough et al. |
| 5,631,656 | A | 5/1997 | Hartman et al. |
| 5,650,764 | A | 7/1997 | McCullough |
| 5,690,347 | A | 11/1997 | Juergens et al. |
| 5,719,713 | A | 2/1998 | Brown |
| 5,747,683 | A | 5/1998 | Gerum et al. |
| 5,821,852 | A | 10/1998 | Fairchild |
| 5,980,048 | A | 11/1999 | Rannells, Jr. et al. |
| 6,041,582 | A | 3/2000 | Tiede et al. |
| 6,042,196 | A | 3/2000 | Nakamura et al. |
| 6,124,709 | A | 9/2000 | Allwine |
| 6,151,175 | A | 11/2000 | Osha |
| 6,198,992 | B1 | 3/2001 | Winslow |
| 6,217,177 | B1 | 4/2001 | Rost |
| 6,218,828 | B1 | 4/2001 | Bates et al. |
| 6,223,104 | B1 | 4/2001 | Kamen et al. |
| 6,223,114 | B1 | 4/2001 | Boros et al. |
| 6,268,800 | B1 | 7/2001 | Howard |
| 6,292,094 | B1 | 9/2001 | Deng et al. |
| 6,351,698 | B1 | 2/2002 | Kubota et al. |
| 6,472,865 | B1 | 10/2002 | Tola et al. |
| 6,480,104 | B1 | 11/2002 | Wall et al. |
| 6,483,429 | B1 | 11/2002 | Yasui et al. |
| 6,494,476 | B2 | 12/2002 | Masters et al. |
| 6,498,977 | B2 | 12/2002 | Wetzel et al. |
| 6,539,288 | B2 | 3/2003 | Ishida et al. |
| 6,568,093 | B2 | 5/2003 | Kogiso et al. |
| 6,577,952 | B2 | 6/2003 | Geierr et al. |
| 6,668,225 | B2 | 12/2003 | Oh et al. |
| 6,704,653 | B2 | 3/2004 | Kuriya et al. |
| 6,712,378 | B1 | 3/2004 | Austin |
| 6,801,125 | B1 | 10/2004 | McGregor et al. |
| 6,806,809 | B2 | 10/2004 | Lee et al. |
| 6,820,888 | B1 | 11/2004 | Griffin |
| 6,838,979 | B2 | 1/2005 | Deng et al. |
| 6,854,557 | B1 | 2/2005 | Deng et al. |
| 6,857,494 | B2 | 2/2005 | Kobayashi et al. |
| 6,879,240 | B2 | 4/2005 | Kruse |
| 6,956,468 | B2 | 10/2005 | Lee et al. |
| 6,959,970 | B2 | 11/2005 | Tseng |
| 6,999,856 | B2 | 2/2006 | Lee et al. |
| 7,005,974 | B2 | 2/2006 | McMahon et al. |
| 7,006,127 | B2 | 2/2006 | Mizusawa et al. |
| 7,008,088 | B2 | 3/2006 | Pisciotti |
| 7,028,804 | B2 | 4/2006 | Eki et al. |
| 7,032,705 | B2 | 4/2006 | Zheng et al. |
| 7,046,127 | B2 | 5/2006 | Boddy |
| 7,058,493 | B2 | 6/2006 | Inagaki |
| 7,089,101 | B2 | 8/2006 | Fischer et al. |
| 7,154,385 | B2 | 12/2006 | Lee et al. |
| 7,159,890 | B2 | 1/2007 | Craig et al. |
| 7,167,785 | B2 | 1/2007 | Lohberg et al. |
| 7,170,285 | B2 | 1/2007 | Spratte |
| 7,171,330 | B2 | 1/2007 | Kruse et al. |
| 7,204,504 | B2 | 4/2007 | Gehring et al. |
| 7,219,913 | B2 | 5/2007 | Atley |
| 7,225,891 | B2 | 6/2007 | Gehring et al. |
| 7,229,139 | B2 | 6/2007 | Lu et al. |
| 7,239,958 | B2 | 7/2007 | Grougan et al. |
| 7,269,489 | B2 | 9/2007 | Deng et al. |
| 7,272,481 | B2 | 9/2007 | Einig et al. |
| 7,295,907 | B2 | 11/2007 | Lu et al. |
| 7,401,871 | B2 | 7/2008 | Lu et al. |
| 7,405,557 | B2 | 7/2008 | Spratte et al. |
| 7,413,266 | B2 | 8/2008 | Lenz et al. |
| 7,425,889 | B2 | 9/2008 | Widmann et al. |
| 7,447,585 | B2 | 11/2008 | Tandy, Jr. et al. |
| 7,451,020 | B2 | 11/2008 | Goetting et al. |
| 7,463,137 | B2 | 12/2008 | Wishart et al. |
| 7,504,995 | B2 | 3/2009 | Lawrence et al. |
| 7,532,109 | B2 | 5/2009 | Takahama et al. |
| 7,540,523 | B2 | 6/2009 | Russell et al. |
| 7,548,155 | B2 | 6/2009 | Schutt et al. |
| 7,568,716 | B2 | 8/2009 | Dietz |
| 7,623,952 | B2 | 11/2009 | Unruh et al. |
| 7,648,153 | B2 | 1/2010 | Metternich et al. |
| 7,690,737 | B2 | 4/2010 | Lu |
| 7,715,953 | B2 | 5/2010 | Shepard |
| 7,731,302 | B2 | 6/2010 | Tandy, Jr. et al. |
| 7,793,965 | B2 | 9/2010 | Padula |
| 7,798,263 | B2 | 9/2010 | Tandy, Jr. et al. |
| 7,878,545 | B2 | 2/2011 | Rhymer et al. |
| 7,904,222 | B2 | 3/2011 | Lee et al. |
| 7,905,507 | B2 | 3/2011 | Perri |
| 7,950,751 | B2 | 5/2011 | Offerle et al. |
| 7,953,536 | B2 | 5/2011 | Katrak |
| 7,974,444 | B2 | 7/2011 | Hongo |
| 8,010,252 | B2 | 8/2011 | Getman et al. |
| 8,010,253 | B2 | 8/2011 | Lundquist |
| 8,036,792 | B2 | 10/2011 | Dechamp |
| 8,038,166 | B1 | 10/2011 | Piesinger |
| 8,044,779 | B2 | 10/2011 | Hahn et al. |
| 8,073,594 | B2 | 12/2011 | Lee et al. |
| 8,157,284 | B1 | 4/2012 | McGhie et al. |
| 8,165,770 | B2 | 4/2012 | Getman et al. |
| 8,167,444 | B2 | 5/2012 | Lee et al. |
| 8,170,726 | B2 | 5/2012 | Chen et al. |
| 8,174,576 | B2 | 5/2012 | Akatsuka et al. |
| 8,180,543 | B2 | 5/2012 | Futamura et al. |
| 8,190,364 | B2 | 5/2012 | Rekow |
| 8,191,915 | B2 | 6/2012 | Freese, V et al. |
| 8,192,036 | B2 | 6/2012 | Lee et al. |
| 8,215,436 | B2 | 7/2012 | DeGrave et al. |
| 8,223,204 | B2 | 7/2012 | Hahn |
| 8,244,442 | B2 | 8/2012 | Craig et al. |
| 8,260,518 | B2 | 9/2012 | Englert |
| 8,267,485 | B2 | 9/2012 | Barlsen et al. |
| 8,280,607 | B2 | 10/2012 | Gatti et al. |
| 8,308,182 | B2 | 11/2012 | Ortmann et al. |
| 8,326,504 | B2 | 12/2012 | Wu et al. |
| 8,342,560 | B2 | 1/2013 | Albers et al. |
| 8,380,390 | B2 | 2/2013 | Sy et al. |
| 8,380,416 | B2 | 2/2013 | Offerle et al. |
| 8,393,632 | B2 | 3/2013 | Vortmeyer et al. |
| 8,401,744 | B2 | 3/2013 | Chiocco |
| 8,427,288 | B2 | 4/2013 | Schofield et al. |
| 8,469,125 | B2 | 6/2013 | Yu et al. |
| 8,504,243 | B2 | 8/2013 | Kageyama |
| 8,548,680 | B2 | 10/2013 | Ryerson et al. |
| 8,548,683 | B2 | 10/2013 | Cebon et al. |
| 8,576,115 | B2 | 11/2013 | Basten |
| 8,626,382 | B2 | 1/2014 | Obradovich |
| 8,675,953 | B1 | 3/2014 | Elwell et al. |
| 8,755,984 | B2 | 6/2014 | Rupp et al. |
| 8,807,261 | B2 | 8/2014 | Subrt et al. |
| 8,825,328 | B2 | 9/2014 | Rupp et al. |
| 8,833,789 | B2 | 9/2014 | Anderson |
| 8,886,400 | B2 | 11/2014 | Kossira et al. |

(56) References Cited

U.S. PATENT DOCUMENTS

| | | |
|---|---|---|
| 8,888,120 B2 | 11/2014 | Trevino |
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 8,972,109 B2 | 3/2015 | Lavoie et al. |
| 9,008,913 B1 | 4/2015 | Sears et al. |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,108,598 B2 | 8/2015 | Headley |
| 9,114,832 B2 | 8/2015 | Wang et al. |
| 9,120,358 B2 | 9/2015 | Motts et al. |
| 9,120,359 B2 | 9/2015 | Chiu et al. |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,187,124 B2 | 11/2015 | Trombley et al. |
| 9,227,474 B2 | 1/2016 | Liu |
| 9,238,483 B2 | 1/2016 | Hafner et al. |
| 9,248,858 B2 | 2/2016 | Lavoie et al. |
| 9,296,422 B2 | 3/2016 | Lavoie |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,340,228 B2 | 5/2016 | Xu et al. |
| 9,393,996 B2 | 7/2016 | Goswami et al. |
| 9,434,414 B2 | 9/2016 | Lavoie |
| 9,500,497 B2 | 11/2016 | Lavoie |
| 9,563,967 B2 * | 2/2017 | Kintou .............. G06T 3/40 |
| 9,601,083 B2 * | 3/2017 | Ramanathan .......... G09G 5/10 |
| 9,616,923 B2 | 4/2017 | Lavoie |
| 9,623,904 B2 | 4/2017 | Lavoie et al. |
| 9,676,377 B2 | 6/2017 | Hafner et al. |
| 2001/0024333 A1 | 9/2001 | Rost |
| 2001/0037164 A1 | 11/2001 | Hecker |
| 2002/0128764 A1 | 9/2002 | Hecker et al. |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2004/0130441 A1 | 7/2004 | Lee et al. |
| 2004/0222881 A1 | 11/2004 | Deng et al. |
| 2005/0000738 A1 | 1/2005 | Gehring et al. |
| 2005/0128059 A1 | 6/2005 | Vause |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0206231 A1 | 9/2005 | Lu et al. |
| 2005/0236201 A1 | 10/2005 | Spannheimer et al. |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0244579 A1 | 11/2006 | Raab |
| 2007/0027581 A1 | 2/2007 | Bauer et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0285808 A1 | 12/2007 | Beale |
| 2008/0143593 A1 | 6/2008 | Graziano et al. |
| 2008/0147277 A1 | 6/2008 | Lu et al. |
| 2008/0231701 A1 | 9/2008 | Greenwood et al. |
| 2008/0312792 A1 | 12/2008 | Dechamp |
| 2009/0005932 A1 | 1/2009 | Lee et al. |
| 2009/0079828 A1 | 3/2009 | Lee et al. |
| 2009/0085775 A1 | 4/2009 | Otsuka et al. |
| 2009/0093928 A1 | 4/2009 | Getman et al. |
| 2009/0198425 A1 | 8/2009 | Englert |
| 2009/0228182 A1 | 9/2009 | Waldbauer et al. |
| 2009/0248346 A1 | 10/2009 | Fennel et al. |
| 2009/0300701 A1 | 12/2009 | Karaoguz et al. |
| 2009/0306861 A1 | 12/2009 | Schumann et al. |
| 2010/0063702 A1 | 3/2010 | Sabelstrom et al. |
| 2010/0171828 A1 | 7/2010 | Ishii |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0087398 A1 | 4/2011 | Lu et al. |
| 2011/0112721 A1 | 5/2011 | Wang et al. |
| 2011/0125457 A1 | 5/2011 | Lee et al. |
| 2011/0160956 A1 | 6/2011 | Chung et al. |
| 2011/0257860 A1 | 10/2011 | Getman et al. |
| 2012/0041658 A1 | 2/2012 | Turner |
| 2012/0086808 A1 | 4/2012 | Lynam et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0185131 A1 | 7/2012 | Headley |
| 2012/0200706 A1 | 8/2012 | Greenwood et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0310594 A1 | 12/2012 | Watanabe |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0082453 A1 | 4/2013 | Padula |
| 2013/0153662 A1 * | 6/2013 | Narasa Prakash ... G06K 7/1486 |
| | | 235/462.07 |
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |
| 2013/0250114 A1 | 9/2013 | Lu |
| 2013/0261843 A1 | 10/2013 | Kossira et al. |
| 2013/0268160 A1 | 10/2013 | Trombley et al. |
| 2014/0005918 A1 | 1/2014 | Qiang |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0088824 A1 | 3/2014 | Ishimoto |
| 2014/0160276 A1 | 6/2014 | Pliefke et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0200759 A1 * | 7/2014 | Lu .................. B60D 1/245 |
| | | 701/28 |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 * | 9/2014 | Lavoie ............... H04N 7/183 |
| | | 348/113 |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0358429 A1 | 12/2014 | Shutko et al. |
| 2014/0379217 A1 | 12/2014 | Rupp et al. |
| 2015/0002670 A1 | 1/2015 | Bajpai |
| 2015/0035256 A1 | 2/2015 | Klank et al. |
| 2015/0057903 A1 | 2/2015 | Rhode et al. |

(56) References Cited

U.S. PATENT DOCUMENTS

| | | | |
|---|---|---|---|
| 2015/0066296 | A1 | 3/2015 | Trombley et al. |
| 2015/0066298 | A1 | 3/2015 | Sharma et al. |
| 2015/0105975 | A1 | 4/2015 | Dunn |
| 2015/0115571 | A1 | 4/2015 | Zhang et al. |
| 2015/0116523 | A1* | 4/2015 | Sinha .............. H04N 5/23241 348/211.3 |
| 2015/0120141 | A1 | 4/2015 | Lavoie et al. |
| 2015/0120143 | A1 | 4/2015 | Schlichting |
| 2015/0134183 | A1 | 5/2015 | Lavoie et al. |
| 2015/0138340 | A1 | 5/2015 | Lavoie |
| 2015/0149040 | A1 | 5/2015 | Hueger et al. |
| 2015/0158527 | A1 | 6/2015 | Hafner et al. |
| 2015/0165850 | A1 | 6/2015 | Chiu et al. |
| 2015/0197278 | A1 | 7/2015 | Boos et al. |
| 2015/0203156 | A1 | 7/2015 | Hafner et al. |
| 2015/0210254 | A1 | 7/2015 | Pieronek et al. |
| 2015/0210317 | A1 | 7/2015 | Hafner et al. |
| 2015/0217693 | A1 | 8/2015 | Pliefke et al. |
| 2015/0269444 | A1 | 9/2015 | Lameyre et al. |
| 2016/0001705 | A1 | 1/2016 | Greenwood et al. |
| 2016/0009288 | A1 | 1/2016 | Yu |
| 2016/0039456 | A1 | 2/2016 | Lavoie et al. |
| 2016/0059780 | A1 | 3/2016 | Lavoie |
| 2016/0059888 | A1 | 3/2016 | Bradley et al. |
| 2016/0059889 | A1 | 3/2016 | Herzog et al. |
| 2016/0096549 | A1 | 4/2016 | Herzog et al. |
| 2016/0129939 | A1 | 5/2016 | Singh et al. |
| 2016/0152263 | A1 | 6/2016 | Singh et al. |
| 2016/0153778 | A1 | 6/2016 | Singh et al. |
| 2016/0229452 | A1 | 8/2016 | Lavoie et al. |
| 2016/0280267 | A1 | 9/2016 | Lavoie et al. |
| 2017/0073005 | A1 | 3/2017 | Ghneim et al. |

FOREIGN PATENT DOCUMENTS

| | | | |
|---|---|---|---|
| DE | 3931518 | A1 | 4/1991 |
| DE | 9208595 | U1 | 8/1992 |
| DE | 19526702 | A1 | 2/1997 |
| DE | 10030738 | C1 | 8/2001 |
| DE | 10031244 | A1 | 1/2002 |
| DE | 10065230 | A1 | 7/2002 |
| DE | 10122562 | C1 | 7/2002 |
| DE | 10154612 | A1 | 5/2003 |
| DE | 10312548 | B3 | 5/2004 |
| DE | 10333998 | A1 | 2/2005 |
| DE | 102004050149 | A1 | 4/2006 |
| DE | 102005042957 | A1 | 3/2007 |
| DE | 102005043466 | A1 | 3/2007 |
| DE | 102005043467 | A1 | 3/2007 |
| DE | 102005043468 | A1 | 3/2007 |
| DE | 102006002294 | A1 | 7/2007 |
| DE | 102006048947 | A1 | 4/2008 |
| DE | 102006056408 | A1 | 6/2008 |
| DE | 102008020838 | A1 | 11/2008 |
| DE | 102007029413 | A1 | 1/2009 |
| DE | 102008045436 | A1 | 3/2010 |
| DE | 102006035021 | B4 | 4/2010 |
| DE | 102008043675 | A1 | 5/2010 |
| DE | 102009007990 | A1 | 8/2010 |
| DE | 102009012253 | A1 | 9/2010 |
| DE | 102009027041 | A1 | 12/2010 |
| DE | 102009038552 | A1 | 2/2011 |
| DE | 102010006323 | A1 | 8/2011 |
| DE | 102008004158 | B4 | 10/2011 |
| DE | 102008004159 | B4 | 10/2011 |
| DE | 102008004160 | B4 | 10/2011 |
| DE | 102010021052 | A1 | 11/2011 |
| DE | 102010029184 | A1 | 11/2011 |
| DE | 102010045519 | A1 | 3/2012 |
| DE | 102011104256 | A1 | 7/2012 |
| DE | 102011101990 | B3 | 10/2012 |
| DE | 102012005707 | A1 | 10/2012 |
| DE | 202012010517 | U | 12/2012 |
| DE | 102011108440 | A1 | 1/2013 |
| DE | 102011120814 | A1 | 6/2013 |
| DE | 102012006206 | A1 | 10/2013 |
| DE | 102012206133 | A1 | 10/2013 |
| DE | 102012019234 | A1 | 4/2014 |
| DE | 102013000198 | A1 | 7/2014 |
| EP | 0418653 | A1 | 3/1991 |
| EP | 0433858 | A2 | 6/1991 |
| EP | 1361543 | A2 | 11/2003 |
| EP | 1593552 | B1 | 3/2007 |
| EP | 1810913 | A1 | 7/2007 |
| EP | 2388180 | A2 | 11/2011 |
| EP | 2452549 | A1 | 5/2012 |
| EP | 2487454 | A2 | 8/2012 |
| EP | 2551132 | A1 | 1/2013 |
| EP | 2644477 | A1 | 10/2013 |
| EP | 2803944 | A2 | 11/2014 |
| FR | 2515379 | A1 | 4/1983 |
| GB | 2265587 | A | 10/1993 |
| GB | 2342630 | A | 4/2000 |
| GB | 2398048 | A | 8/2004 |
| GB | 2398049 | A | 8/2004 |
| GB | 2398050 | A | 8/2004 |
| JP | 61006458 | | 1/1986 |
| JP | 6159491 | A | 3/1986 |
| JP | 6385568 | U | 6/1988 |
| JP | 01095980 | A | 4/1989 |
| JP | 01095981 | A | 4/1989 |
| JP | 09267762 | A | 10/1997 |
| JP | 09328078 | A | 12/1997 |
| JP | 10001063 | A | 1/1998 |
| JP | 11124051 | A | 5/1999 |
| JP | 11278319 | A | 10/1999 |
| JP | 2002012172 | A | 1/2002 |
| JP | 2002068032 | A | 3/2002 |
| JP | 2003034261 | A | 2/2003 |
| JP | 2003148938 | A | 5/2003 |
| JP | 3716722 | B2 | 11/2005 |
| JP | 2008027138 | A1 | 2/2008 |
| JP | 2012105158 | A | 5/2012 |
| JP | 2012166647 | A | 9/2012 |
| JP | 2014002056 | A | 1/2014 |
| WO | 8503263 | A1 | 8/1985 |
| WO | 0044605 | A1 | 8/2000 |
| WO | 2005005200 | A2 | 1/2005 |
| WO | 2005116688 | A2 | 12/2005 |
| WO | 2006042665 | A1 | 4/2006 |
| WO | 2012059207 | A1 | 5/2012 |
| WO | 2012103193 | A1 | 8/2012 |
| WO | 2014019730 | A1 | 2/2014 |
| WO | 2014037500 | A1 | 3/2014 |
| WO | 2014070047 | A1 | 5/2014 |
| WO | 2014092611 | A1 | 6/2014 |
| WO | 2014123575 | A1 | 8/2014 |
| WO | 2015074027 | A1 | 5/2015 |
| WO | 2015187467 | A1 | 12/2015 |

OTHER PUBLICATIONS

Kristopher Bunker, "2012 Guide to Towing", Trailer Life, 2012, 38 pages.

A. Gonzalez-Cantos, "Backing-Up Maneuvers of Autonomous Tractor-Trailer Vehicles using the Qualitative Theory of Nonlinear Dynamical Systems, International Journal of Robotics Research," Jan. 2009, vol. 28, 1 page.

L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.

M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.

F.W. Kienhöfer; D. Cebon, "An Investigation of ABS Strategies for Articulated Vehicles", Cambridge University, Engineering Department, United Kingdom, date unknown, 13 pages.

(56) References Cited

OTHER PUBLICATIONS

C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, 8 pages.
Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.
Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.
J. Roh; H. Lee; W. Chung, "Control of a Car with a Trailer Using the Driver Assistance System", IEEE, International Conference on Robotics and Biomimetics; Phuket, Thailand, Dec. 2011, 6 pages.
A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.
Zare, A. Sharafi; M. Kamyad, A.V., "A New Approach in Intelligent Trailer Parking", IEEE, 2010 2nd International Mechanical and Electrical Technology (ICMET), Sep. 2010, 1 page.
Tanaka, K.; Sano, M., "A Robust Stabilization Problem of Fuzzy Control Systems and its Application to Backing up Control of a Truck-trailer", IEEE Transactions on Fuzzy Systems, May 1994, vol. 2, No. 2, 1 page.
Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.
Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.
Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page.
P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.
Dieter Zöbel, David Polock, Philipp Wojke, "Steering Assistance for Backing Up Articulated Vehicles", Systemics, Cybernetics and Informatics; vol. 1, No. 5, date unknown, 6 pages.
J.R. Billing; J.D. Patten; R.B. Madill, "Development of Configurations for Infrastructure-Friendly Five- and Six-Axle SemiTrailers", National Research Council of Canada and Ontario Ministry of Transportation, date unknown, 11 pages.
Jesus Morales, Anthony Mandow, Jorge L. Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.

Cedric Pradalier and Kane Usher, "Experiments in Autonomous Reversing of a Tractor-Trailer System", 6th International Conference on Field and Service Robotics, inria—00195700, Version 1, Dec. 2007, 10 pages.
Andri Riid, Alar Leibak, Ennu Rüstern, "Fuzzy Backing Control of Truck and Two Trailers", Tallinn University of Technology; Tallinn, Estonia, date unknown, 6 pages.
Jane McGrath, "How to Avoid Jackknifing", A Discovery Company, date unknown, 3 pages.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.
Jujnovich, B.; Roebuck, R.; Odhams, A.; David, C., "Implementation of Active Rear Steering of a Tractor Semitrailer", Cambridge University, Engineering Department; Cambridge, United Kingdom, date unknown, 10 pages.
A.M.C. Odhams; R.L. Roebuck; C. Cebon, "Implementation of Active Steering on a Multiple Trailer Long Combination Vehicle", Cambridge University, Engineering Department; Cambridge, United Kingdom, date unknown, 13 pages.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.
Lee Yong H.; Weiwen Deng; Chin Yuen-Kwok Steve; McKay Neil, "Feasibility Study for a Vehicle-Trailer Backing Up Control", Refdoc.fr, SAE Transactions, vol. 113, No. 6, 2004, 1 page.
A.M.C. Odhams; R.L. Roebuck; B.A. Jujnovich; D. Cebon, "Active Steering of a Tractor-Semi-Trailer" Proceedings of the Institution of Mechanical Engineers, Part D: Journal of Automobile Engineering, SAGE Journals, vol. 225, No. 7, Jul. 2011, 1 page.
Haviland, G S, "Automatic Brake Control for Trucks—What Good Is It?", TRID, Society of Automotive Engineers, Sep. 1968, 1 page.
William E. Travis; David W. Hodo; David M. Bevly; John Y. Hung, "UGV Trailer Position Estimation Using a Dynamic Base RTK System", American Institute of Aeronautics and Astronautics, date unknown, 12 pages.
"VSE Electronic Trailer Steering", ETS for Trailers, version 2009, VSE Trailer Systems B.V., 2009, 28 pages.
"Telematics Past, Present, and Future," Automotive Service Association, www.ASAshop.org, May 2008, 20 pages.
"Fully Automatic Trailer Tow Hitch With LIN Bus," https://webista.bmw.com/webista/show?id=1860575499&lang=engb&print=1, date unknown, 5 pages.
"VBOX Yaw Rate Sensor With Integral Accelerometers," Racelogic, www.racelogic.co.uk, date unknown, 2 pages.
P.D.C.R Jayarathna; J.V Wijayakulasooriya; S.R Kodituwakku, "Fuzzy Logic and Neural Network Control Systems for Backing up a Truck and a Trailer", International Journal of Latest Trends in Computing, vol. 2, No. 3, Sep. 2011, 8 pages.
Olof Enqvist, "AFS-Assisted Trailer Reversing," Institutionen för systemteknik Deartment of Electrical Engineering, Jan. 27, 2006, 57 pages.
SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.
F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.
Novak, Domen; Dovzan, Dejan; Grebensek, Rok; Oblak, Simon, "Automated Parking System for a Truck and Trailer, International Conference on Advances in the Internet, Processing, Systems and Interdisciplinary Research", Florence, 2007, WorldCat.org, 13 pgs.

\* cited by examiner

TRAILER MONITORING SYSTEM AND METHOD

FIELD OF THE INVENTION

The present disclosure generally relates to trailer backup assist systems, and more particularly, to trailer backup systems employing a vision-based sensor.

BACKGROUND OF THE INVENTION

Reversing a vehicle while towing a trailer can be challenging for many drivers, particularly for drivers that drive with a trailer on an infrequent basis or with various types of trailers. Systems used to assist a driver with backing a trailer can determine the position of the trailer relative to the vehicle with imager-based target detection. The accuracy and reliability of this hitch angle determination can be necessary for the operation of the backup assist system.

SUMMARY OF THE INVENTION

According to one aspect of the present invention, a trailer monitoring system is disclosed. The system includes an imager configured to image a scene rearward of a vehicle and containing a target disposed on a trailer attached to the vehicle. The imager is configured separate the images into a first portion and a second portion. A display is configured to display the first portion of images. A controller is configured to analyze the second portion of images, adjust an image capture setting of the imager based on a status input, and modify each image in the second portion to increase the size of the imaged target relative to the total size of the captured image to determine at least one trailer related information.

According to another aspect of the present invention, a vehicle system is disclosed. The vehicle system includes an imager configured to image a scene rearward of a vehicle containing a trailer attached thereto. The imager is configured to alternately distribute a plurality of images from the imager into first and second portions. A display is configured to display the first portion of images. A controller is configured to receive the second portion of images and analyze the second portion images to determine at least one vehicle related information.

According to a further aspect of the present invention, a trailer backup assist system method is disclosed. The method includes imaging a scene rearward of a vehicle having a trailer attached thereto. Next, the images are separated into a first portion and a second portion. The first portion of images are displayed on a display. A controller is used to set a reference point. The second portion of images are analyzed with respect to the reference point to determine whether an adjustment to a camera image capture setting is needed.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
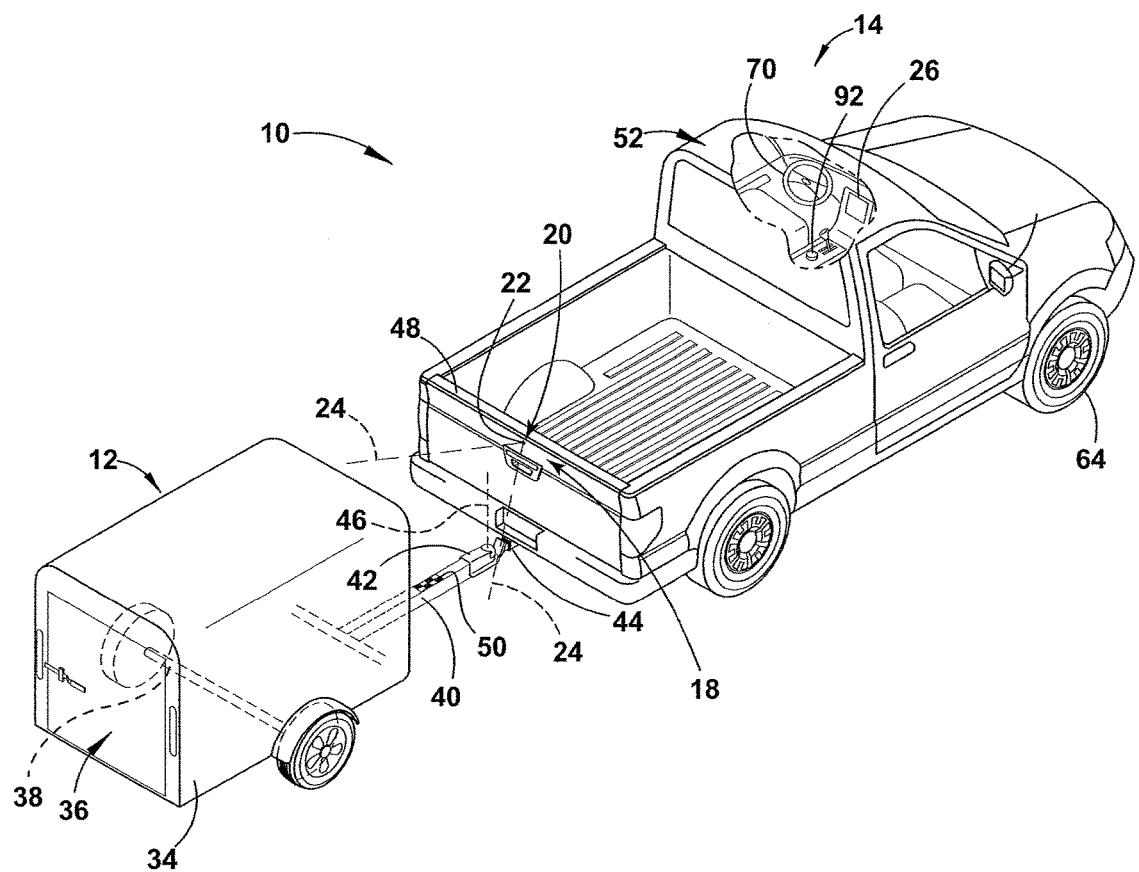
FIG. 1 is a top perspective view of a vehicle attached to a trailer with one embodiment of a hitch angle sensor for operating a trailer backup assist system.

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

Referring to FIGS. 1-12B, reference numeral 10 generally designates a trailer backup assist system for controlling a backing path of a trailer 12 attached to a vehicle 14 by allowing a driver of the vehicle 14 to specify a desired curvature 16 of the backing path of the trailer 12. In one embodiment, the trailer backup assist system 10 automatically steers the vehicle 14 to guide the trailer 12 on the desired curvature or backing path 16 as a driver uses the accelerator and brake pedals to control the reversing speed of the vehicle 14. To monitor the position of the trailer 12 relative to the vehicle 14, the trailer backup assist system 10 may include a sensor system 18 that senses or otherwise determines a hitch angle between the trailer 12 and the vehicle 14.

According to one embodiment, the sensor system 18 may include a hitch angle sensor 20 that employs a camera 22 (e.g., video imaging camera) that has an imaging field of view 24 located and oriented to capture one or more images (i.e., images) of the trailer 12. A display 26 is disposed within the system that receives a first portion of images 28 from the camera 22 and a second portion of images 30 is received by a trailer monitoring system 32 for analyzing vehicle and/or trailer related information.

Figure 3:
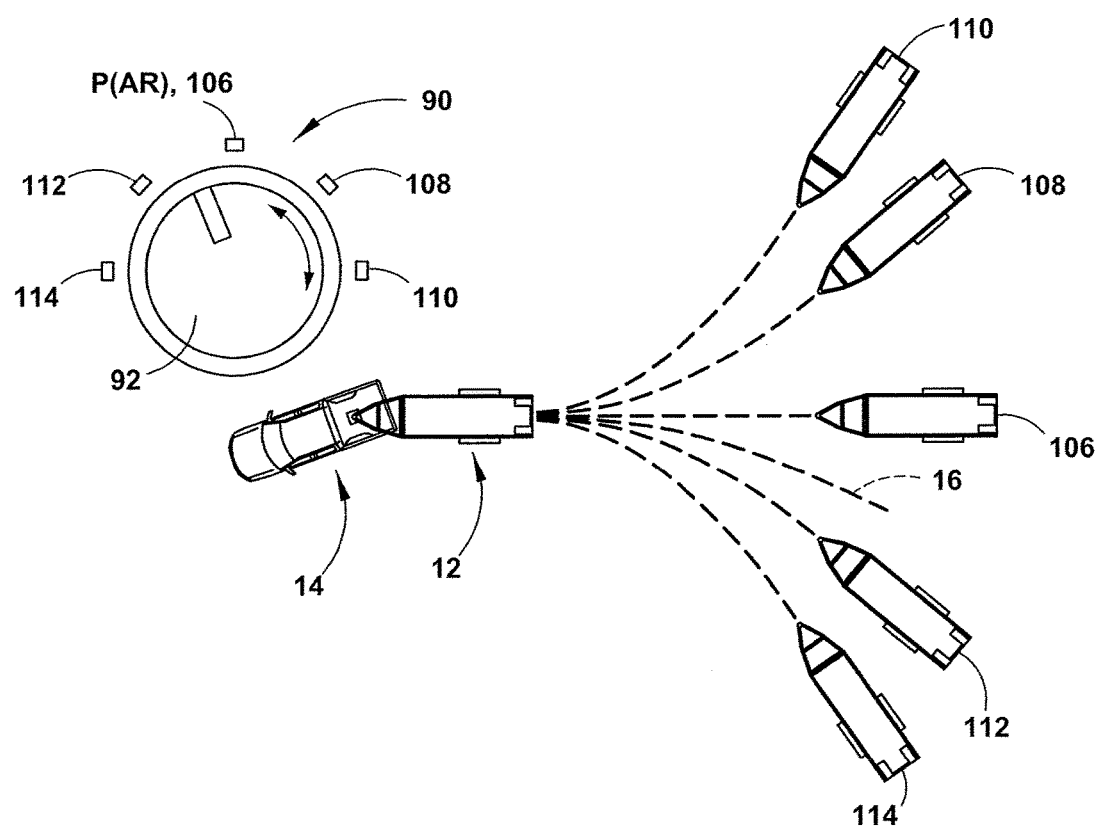
FIG. 3 is a plan view of an embodiment of a rotatable knob for selecting a desired curvature of a trailer and a corresponding schematic diagram illustrating a vehicle and a trailer with various trailer curvature paths correlating with desired curvatures that may be selected.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 34 with an enclosed cargo area 36, a single axle 38, and a tongue 40 longitudinally extending forward from the enclosed cargo area 36. The illustrated trailer 12 also has a trailer hitch connector in the form of a coupler assembly 42 that is connected to a vehicle hitch connector in the form of a hitch ball 44. The coupler assembly 42 latches onto the hitch ball 44 to provide a pivoting ball joint connection 46 that allows for articulation of the hitch angle $\gamma$ (FIG. 3). It should be appreciated that additional embodiments of the trailer 12 may alternatively couple with the vehicle 14 to provide a pivoting connection, such as by connecting with a fifth wheel connector. It is also contemplated that additional embodiments of the trailer 12 may include more than one axle 38 and may have various shapes and sizes configured for different loads and items, such as a boat trailer or a flatbed trailer.

Still referring to FIG. 1, the sensor system 18 in the illustrated embodiment includes a vision-based hitch angle sensor 20 for estimating the hitch angle $\gamma$ between the vehicle 14 and the trailer 12. The illustrated hitch angle sensor 20 employs a camera 22 that may be located proximate an upper region of the vehicle tailgate 48 at the rear of the vehicle 14, as shown, such that the camera 22 may be elevated relative to the tongue 40 of the trailer 12. The illustrated camera 22 has an imaging field of view 24 located and oriented to capture one or more images of the trailer 12, including a region containing one or more desired target placement zones 174 (FIG. 9) where a target 50 may be secured.

Although it is contemplated that the camera 22 may capture images of the trailer 12 without a target 50 to determine the hitch angle $\gamma$, in the illustrated embodiment, the trailer backup assist system 10 includes a target 50 placed on the trailer 12 to allow the trailer backup assist system 10 to utilize information acquired via image acquisition and processing of the target 50. For instance, the illustrated camera 22 may include a video imaging camera that repeatedly captures successive images of the trailer 12 that may be processed to identify the target 50 and its location on the trailer 12 for determining movement of the target 50 and the trailer 12 relative to the vehicle 14 and the corresponding hitch angle $\gamma$. It should also be appreciated that the camera 22 may include one or more video imaging cameras and may be located at other locations on the vehicle 14 to acquire images of the trailer 12 and the desired target placement zone 174, such as on a passenger cab 52 of the vehicle 14 to capture images of a gooseneck trailer. Furthermore, it is contemplated that additional embodiments of the hitch angle sensor 20 and the sensor system 18 for providing the hitch angle $\gamma$ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 46, energy transducers of a reverse aid system, a blind spot system, and/or a cross traffic alert system, and other conceivable sensors or indicators of the hitch angle $\gamma$ to supplement or be used in place of the vision-based hitch angle sensor 20.

Figure 2:
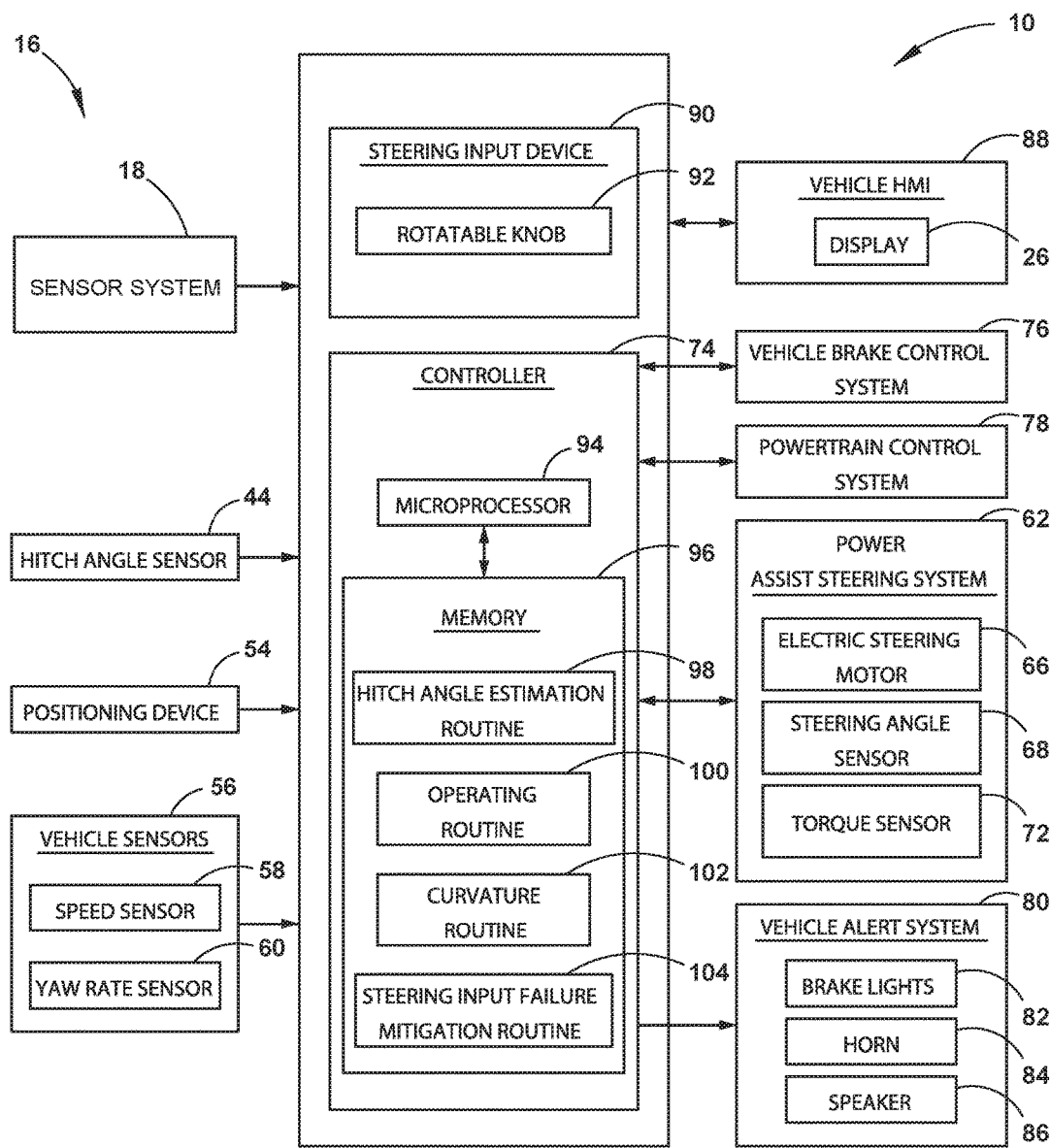
FIG. 2 is a block diagram illustrating one embodiment of the trailer backup assist system having a steering input device, a curvature controller, and a trailer braking system.

With reference to the embodiment of the trailer backup assist system 10 shown in FIG. 2, the trailer backup assist system 10 may receive vehicle and trailer status-related information from a plurality of sensors and devices. The plurality of sensors and devices may be used in lieu of the hitch angle sensor 20 in the event that one or more sensors used for determining the hitch angle $\gamma$ (FIG. 3) fail. This trailer status-related information includes positioning information from a positioning device 54, which may include a global positioning system (GPS) on the vehicle 14 or a hand held device, to determine a coordinate location of the vehicle 14 and the trailer 12 based on the location of the positioning device 54 with respect to the trailer 12 and/or the vehicle 14 and based on the estimated hitch angle $\gamma$. The positioning device 54 may additionally or alternatively include a dead reckoning system for determining the coordinate location of the vehicle 14 and the trailer 12 within a localized coordinate system based at least on vehicle speed, steering angle, and hitch angle $\gamma$. Any vehicle sensor 56 may communicate vehicle information to the trailer backup assist system 10, which may include a speed of the vehicle 14 from a speed sensor 58 and a yaw rate of the vehicle 14 from a vehicle yaw rate sensor 60.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature 16 of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 68 of the power assist steering system 62. The steering command may be provided by the trailer backup assist system 10 for autonomously steering during a backup maneuver and may alternatively be provided manually via a rotational position (e.g., steering wheel angle) of a steering wheel 70 (FIG. 1). However, in the illustrated embodiment, the steering wheel 70 of the vehicle 14 is mechanically coupled with the steered wheels 64 of the vehicle 14, such that the steering wheel 70 moves in concert with steered wheels 64 via an internal torque, preventing manual intervention with the steering wheel 70 during autonomous steering. More specifically, a torque sensor 72 is provided on the power assist steering system 62 that senses torque (e.g., gripping and/or turning) on the steering wheel 70 that is not expected from autonomous control of the steering wheel 70 and therefore indicative of manual intervention by the driver. In some embodiments, external torque applied to the steering wheel 70 may serve as a signal to the controller 74 that the driver has taken manual control and for the vehicle 14 to discontinue steering maneuvers and/or alerts.

In alternative embodiments, some vehicles 14 have a power assist steering system 62 that allows a steering wheel 70 to be partially decoupled from movement of the steered wheels 64 of such a vehicle 14. Accordingly, the steering wheel 70 can be rotated independent of the manner in which the power assist steering system 62 of the vehicle controls the steered wheels 64 (e.g., autonomous steering as commanded by the trailer backup assist system 10). As such, in these types of vehicles 14 where the steering wheel 70 can be selectively decoupled from the steered wheels 64 to allow independent operation thereof, the steering wheel 70 may be used as a steering input device 90 for the trailer backup assist system 10.

Referring again to the embodiment illustrated in FIG. 2, the power assist steering system 62 provides the controller 74 of the trailer backup assist system 10 with information relating to a rotational position of steered wheels 64 of the vehicle 14, including a steering angle. The controller 74 in the illustrated embodiment processes the current steering angle, in addition to other vehicle 14 and trailer 12 conditions, to guide the trailer 12 along the desired curvature 16. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 90, the hitch angle sensor 20, the power assist steering system 62, a vehicle brake control system 76, a powertrain control system 78, and other vehicle sensors and devices.

With further reference to FIG. 2, the vehicle brake control system 76 may also communicate with the controller 74 to provide the trailer backup assist system 10 with braking information, such as vehicle wheel speed, and to receive braking commands from the controller 74. For instance, vehicle speed information can be determined from individual wheel speeds as monitored by the brake control system 76. Vehicle speed may also be determined from the powertrain control system 78, the speed sensor 58, and the positioning device 54, among other conceivable means. In some embodiments, individual wheel speeds can also be used to determine a vehicle yaw rate, which can be provided to the trailer backup assist system 10 in the alternative, or in addition to, the vehicle yaw rate sensor 60.

In certain embodiments, the trailer backup assist system 10 can provide vehicle braking information to the brake control system 76 for allowing the trailer backup assist system 10 to control braking of the vehicle 14 during backing of the trailer 12. For example, the trailer backup assist system 10, in some embodiments, may regulate speed of the vehicle 14 during backing of the trailer 12, which can reduce the potential for unacceptable trailer backup conditions. Examples of unacceptable trailer backup conditions include, but are not limited to, a vehicle 14 over-speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. Unacceptable trailer backup conditions may result from the failure of one or more sensors and/or inputs on the vehicle 14 and/or trailer 12 to provide information to the controller 74 of the trailer backup assist system 10. In such events, the driver may be unaware of the failure until the unacceptable trailer backup condition is imminent or already happening. Therefore, it is disclosed herein that the trailer backup assist system 10 can generate an alert signal corresponding to a notification of an actual, impending, and/or anticipated unacceptable trailer backup condition, and prior to driver intervention, generate a counter measure to prevent such an unacceptable trailer backup condition.

The powertrain control system 78, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability, or when the failure of a sensor and/or an input device 90 is detected. Similar to high-speed considerations as they relate to unacceptable trailer backup conditions, high acceleration, and high dynamic driver curvature requests can also lead to such unacceptable trailer backup conditions.

With continued reference to FIG. 2, the trailer backup assist system 10, in the illustrated embodiment, may communicate with one or more devices, including a vehicle alert system 80, which may prompt visual, auditory, and tactile warnings. For instance, vehicle brake lights 82 and vehicle emergency flashers may provide a visual alert and a vehicle horn 84 and/or speaker 86 may provide an audible alert. Additionally, the trailer backup assist system 10 and/or vehicle alert system 80 may communicate with a human machine interface (HMI) 88 for the vehicle 14. The HMI 88 may include the vehicle display 26, in the form of a center-stack mounted navigation or entertainment display 26 (FIG. 1) capable of displaying images indicating the alert. Such an embodiment may be desirable to notify the driver of the vehicle 14 that a sensor and/or input device 90 used by the backup assist system 10 had failed. Further, the trailer backup assist system 10 may communicate via wireless communication with another embodiment of the HMI 88, such as with one or more handheld or portable devices, including one or more smartphones. The portable device may also include the display 26 for displaying one or more images and other information to a user. For instance, the portable device may display an image indicating the sensor and/or input device 90 that has failed. In addition, the portable device may provide feedback information, such as visual, audible, and tactile alerts.

As further illustrated in FIG. 2, the trailer backup assist system 10 may include a steering input device 90 that is connected to the controller 74 for allowing communication of information therebetween. It is disclosed herein that the steering input device 90 can be coupled to the controller 74 in a wired or wireless manner. The steering input device 90 provides the trailer backup assist system 10 with information defining the desired backing path of travel of the trailer 12 for the controller 74 to process and generate steering commands. More specifically, the steering input device 90 may provide a selection or positional information that correlates with a desired curvature 16 of the desired backing path of travel of the trailer 12. Also, the trailer steering commands provided by the steering input device 90 can include information relating to a commanded change in the path of travel, such as an incremental change in the desired curvature 16, and information relating to an indication that the trailer 12 is to travel along a path defined by a longitudinal centerline axis of the trailer 12, such as a desired curvature value of zero that defines a substantially straight path of travel for the trailer 12. Given the importance of the steering input device 90 in controlling the vehicle 14 and trailer 12 while in motion, safety systems directed toward mitigating a failure of the steering input device 90 by generating a countermeasure may be a desirable feature in the trailer backup assist system 10. Accordingly, the controller 74 of the trailer backup assist system 10 may detect failure of the steering input device 90 and engage a countermeasure when the steering input device 90 fails, until the driver regains operational control of the vehicle 14.

The steering input device 90, according to one embodiment, may include a movable control input device for allowing a driver of the vehicle 14 to command desired trailer steering actions or otherwise select and alter a desired curvature 16. For instance, the moveable control input device may be a rotatable knob 92, which can be rotatable about a rotational axis extending through a top surface or face of the knob 92. In other embodiments, the rotatable knob 92 may be rotatable about a rotational axis extending substantially parallel to a top surface or face of the rotatable knob 92. Furthermore, the steering input device 90, according to additional embodiments, may include alternative devices for providing a desired curvature 16 or other information defining a desired backing path, such as a joystick, a keypad, a series of depressible buttons or switches, a sliding input device, various user interfaces on a touch-screen display 26, a vision based system for receiving gestures, a control interface on a portable device, and other conceivable input devices as generally understood by one having ordinary skill in the art. It is contemplated that the steering input device 90 may also function as an input device for other features, such as providing inputs for other vehicle features or systems.

Still referring to the embodiment shown in FIG. 2, the controller 74 is configured with a microprocessor 94 to process logic and routines stored in memory 96 that receive information from the sensor system 18, the hitch angle sensor 20, the steering input device 90, the power assist steering system 62, the vehicle brake control system 76, the trailer braking system, the powertrain control system 78, and other vehicle sensors and devices. The controller 74 may generate vehicle steering information and commands as a function of all, or a portion of, the information received. Thereafter, the vehicle steering information and commands may be provided to the power assist steering system 62 for affecting steering of the vehicle 14 to achieve a commanded path of travel for the trailer 12. The controller 74 may include the microprocessor 94 and/or other analog and/or digital circuitry for processing one or more routines. Also, the controller 74 may include the memory 96 for storing one or more routines, including a hitch angle estimation routine 98, an operating routine 100, a curvature routine 102, and a steering input failure mitigation routine 104. It should be appreciated that the controller 74 may be a stand-alone dedicated controller or may be a shared controller integrated with other control functions, such as integrated with the sensor system 18, the power assist steering system 62, and other conceivable onboard or off-board vehicle control systems.

As shown in FIG. 3, a driver can turn the rotatable knob 92 to provide a desired curvature 16 while the driver of the vehicle 14 backs the trailer 12. In the illustrated embodiment, the rotatable knob 92 rotates about a central axis between a center or middle position 106 corresponding to a substantially straight backing path 16 of travel, as defined by the longitudinal direction of the trailer 12, and various rotated positions 108, 110, 112, 114 on opposing sides of the middle position 106, commanding a desired curvature 16 corresponding to a radius of the desired backing path of travel for the trailer 12 at the commanded rotated position.

It is contemplated that the rotatable knob 92 may be configured in accordance with embodiments of the disclosed subject matter and omit a means for being biased to an at-rest position P(AR) between opposing rotational ranges of motion. Lack of such biasing may allow a current rotational position of the rotatable knob 92 to be maintained until the rotational control input device is manually moved to a different position. It is also conceivable that the steering input device 90 may include a non-rotational control device that may be configured to selectively provide a desired curvature 16 and to override or supplement an existing curvature value. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input backing path commands, or a joystick type input and the like.

Figure 4:
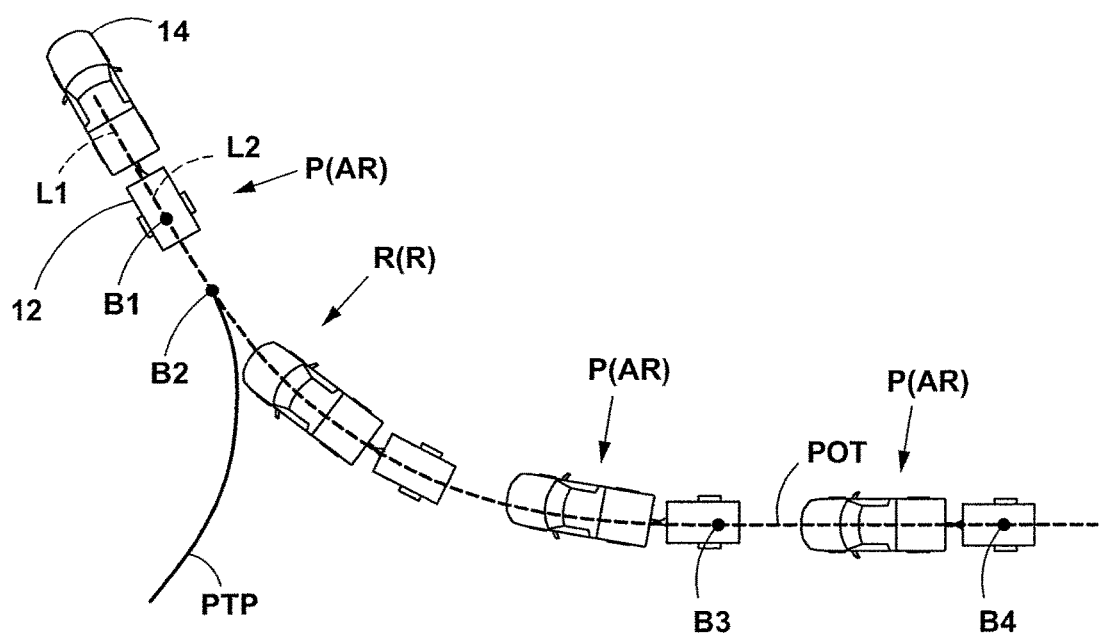
FIG. 4 is a schematic diagram showing a backup sequence of a vehicle and a trailer implementing various curvature selections with the trailer backup assist system, according to one embodiment.

Referring to FIG. 4, an example of using the steering input device 90 for dictating a curvature 16 of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-through path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-through sequence), the driver begins to back the trailer 12 by reversing the vehicle 14 from the first backup position B1. So long as the rotatable knob 92 of the trailer backup steering input device 90 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 92 to command the trailer 12 to be steered to the right (i.e., a knob position R(R) clockwise rotation). Accordingly, the trailer backup assist system 10 will steer the vehicle 14 causing the trailer 12 to be steered to the right as a function of an amount of rotation of the rotatable knob 92 with respect to the at-rest position P(AR), a rate movement of the knob 92, and/or a direction of movement of the knob 92 with respect to the at-rest position P(AR). Similarly, the trailer 12 can be commanded to steer to the left by rotating the rotatable knob 92 to the left. When the trailer 12 reaches backup position B3, the driver allows the rotatable knob 92 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 92 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 92 and straight portions of the path of travel POT are dictated by an orientation of the centerline longitudinal axis L2 of the trailer 12 when the knob 92 is in/returned to the at-rest position P(AR).

Figure 5:
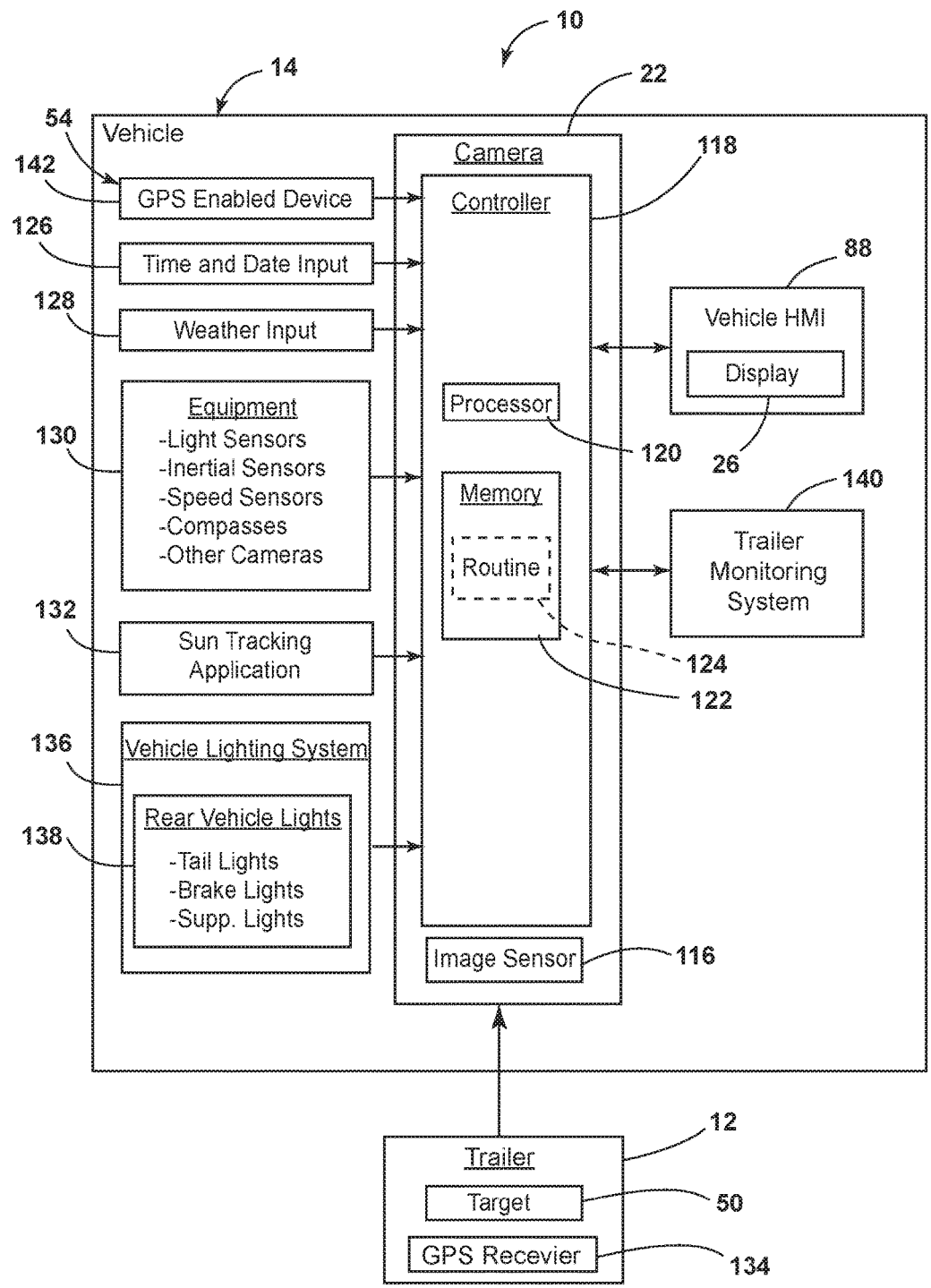
FIG. 5 is a block diagram illustrating a system for adjusting an image capture setting of a camera used in a trailer backup assist system, according to one embodiment.

Referring to FIG. 5, a camera 22 based sensor system 18 is shown, according to one embodiment, and is intended for use within the trailer backup assist system 10. The camera 22 includes an image sensor 116 that captures light and converts it into image data that is outputted to the vehicle display 26 and/or the trailer monitoring system 32, as will be described in greater detail below. In order to accurately image the target 50 while the vehicle 14 and trailer 12 are in motion, one or more image capture settings of the camera 22 may need to be adjusted to compensate for changing light conditions.

The target 50 may be configured in a rectangular configuration having a checker pattern that is recognizable by the camera 22. In one embodiment, the checker pattern alternates between a first color and a second color that is different than the first color. In one arrangement, the first color is green and the second color is red. In another arrangement, the first color is white and the second color is green. However, it should be appreciated that other target shapes, sizes, patterns, and color schemes may be employed.

A controller 118 that may be integrated with the camera 22 or located external thereto. The controller 118 can include circuitry such as a processor 120 and memory 122. A routine 124 for adjusting an image capture setting such as the white balance and the exposure of the camera 22 can be stored in the memory 122 and is executed by the processor 120. In one embodiment, the controller 118 is configured to set a reference point corresponding to an area of the target 50 or trailer 12 that has a known color. By knowing how the reference point should appear in a captured image, the controller 118 can analyze image data received from the camera 22 and adjust the white balance and exposure of the camera 22 to compensate for changing light conditions such as when the vehicle 14 and trailer 12 move from a sunny area to a shaded area.

With respect to the illustrated embodiment, the controller 118 can also communicate with a positioning device 54, shown as a GPS enabled device 142 to receive input related to the geographical location of the vehicle 14 and trailer 12. The GPS enabled device 142 can be any suitable device capable of communicating with the controller 118. In one embodiment, the GPS enabled device 142 is an onboard device such as, but not limited to, the HMI 88. In another embodiment, the GPS enabled device 142 is a portable electronic device such as, but not limited to, a portable GPS device or a GPS enabled smart device, both capable of wirelessly communicating with the controller 118 via Bluetooth®, WIFI, the like, or a combination thereof. Since light conditions may vary depending on one's geographical location, the controller 118 can give consideration to the locational input supplied by the GPS enabled device 142 in deciding whether an adjustment to the white balance and/or exposure of the camera 22 is needed.

Since light conditions may also vary depending on the current time, date, and weather conditions, the controller 118 can additionally receive time and date information via input 126 and weather information via input 128, which may either or both be considered by the controller 118 in deciding whether an adjustment to the white balance and/or exposure of the camera 22 is needed. For example, the light intensity in Florida during a clear summer afternoon will generally be higher than the light intensity in Michigan during an overcast summer morning. Thus, by making this type of information known to the controller 118, the controller 118 can predict certain characteristics related to the light captured by the image sensor 116 of the camera 22 and adjust the image capture settings of the camera 22 accordingly. Per the previously given example, if a vehicle 14 and trailer 12 are located in Florida, the controller 118 may choose to decrease the exposure of the camera 22 and select a white balance setting suited for higher color temperatures whereas the controller 118 may choose to increase the exposure of the camera 22 and select a white balance setting suited for lower color temperatures if the vehicle 14 and trailer 12 are located in Michigan. It is contemplated that the controller 118 can receive the time and date information via the GPS enabled device 142, a portable electronic device, the electronic control module (ECM) of the vehicle 14, or any other suitable means. The weather information may be supplied to the controller 118 via an application running on a portable electronic device or an onboard device (e.g., HMI 88), or any other suitable means.

In addition to the abovementioned inputs, the controller 118 may receive input from one or more equipment 130 located on the vehicle 14 and/or the trailer 12, which includes, but is not limited to, light sensors, speed sensors, inertia sensors, directional compasses, and/or other cameras, which can be provided in front, rear, and side facing configurations. By leveraging some or all of the equipment 130 with other devices and inputs described previously, the controller 118 can determine the orientation of the vehicle 14 and the trailer 12 relative to a light source, such as the sun. In one embodiment, the controller 118 can monitor the sun's location using input received from a sun tracking application 132, which may be stored on an onboard device (e.g., HMI 88) or stored on an external device such as a portable electrical device (e.g., smartphone). This information may be combined with date, time, and weather information received from inputs 126 and 128 respectively, to enable the controller 118 to make adjustments to the white balance and/or exposure of the camera 22 based on the sun's relative position and expected light intensity.

Additionally, the controller 118 can monitor the orientation and heading of the vehicle 14 and trailer 12 relative to the sun via input received from directional compasses, speed sensors, inertia sensors, the GPS enabled device 20, and/or a GPS receiver 134 mounted to the trailer 12. Since the vehicle 14 and trailer 12 dimensions are typically known, the controller 118 can compare the orientation and heading information with the sun's location to predict potential changes in light conditions resulting from the vehicle 14 and/or trailer 12 blocking direct sunlight, which can potentially impact the amount of light captured by the image sensor 116 of the camera 22. For example, in some instances, the vehicle 14 and trailer 12 may be oriented relative to the sun such that the camera 22 and/or imaged area is flooded by sunlight, resulting in a relatively large amount of light being captured by the image sensor 116 of the camera 22. In other instances, the vehicle 14 and trailer 12 may be oriented relative to the sun such that the vehicle 14 and/or trailer 12 are blocking the direct sunlight, which may result in relatively less light being captured by the image sensor 116 of the camera 22. In each of those cases, the controller 118 can use the abovementioned inputs and devices in considering whether an adjustment to the white balance and/or exposure of the camera 22 is needed. Furthermore, the controller 118 can also leverage image data received from other cameras provided on the vehicle 14 and/or trailer 12. Additionally or alternatively, the controller 118 can use light information received via one or more light sensors on board the vehicle 14 and/or trailer 12. The controller 118 can compare the image data and/or the light information against the image data received from the camera 22. Any differences between them can be considered when determining if an adjustment to the white balance and/or exposure of the camera 22 is needed.

According to one embodiment, the trailer backup assist system 10 is configured to compensate for changing light conditions caused from the vehicle lighting system 136 when the rear vehicle lights 138 of the vehicle 14 are activated. The rear lights may include taillights, brake lights 82, supplemental lights, and other forms of rear lighting. When activated, the rear lights may project light upon the imaged scene, thereby causing a sudden change in lighting conditions. If unaccounted for, the trailer backup assist system 10 may experience difficulty tracking the target 50.

The controller 118 can receive status information from the vehicle lighting system 136 indicating whether any of the rear vehicle lights 138 have been activated. Since the light characteristics (e.g., color temperature and intensity) for any given rear vehicle light 138, such as the brake light 82, is known, the controller 118 can subtract the color cast projected by an activated rear vehicle light 138, such as the brake light 82, from a captured image generated by the camera 22. In addition, the light intensity associated with the activated rear vehicle light 138, such as the brake light 82, can be compensated for by either modifying the exposure of each pixel of the image sensor 116 or by compensating the image after it has been captured. In this manner, the imaging system 2600 can respond with the appropriate adjustments to the white balance and/or exposure of the camera 22 when one or more rear vehicle lights 138 are activated.

Figure 6:
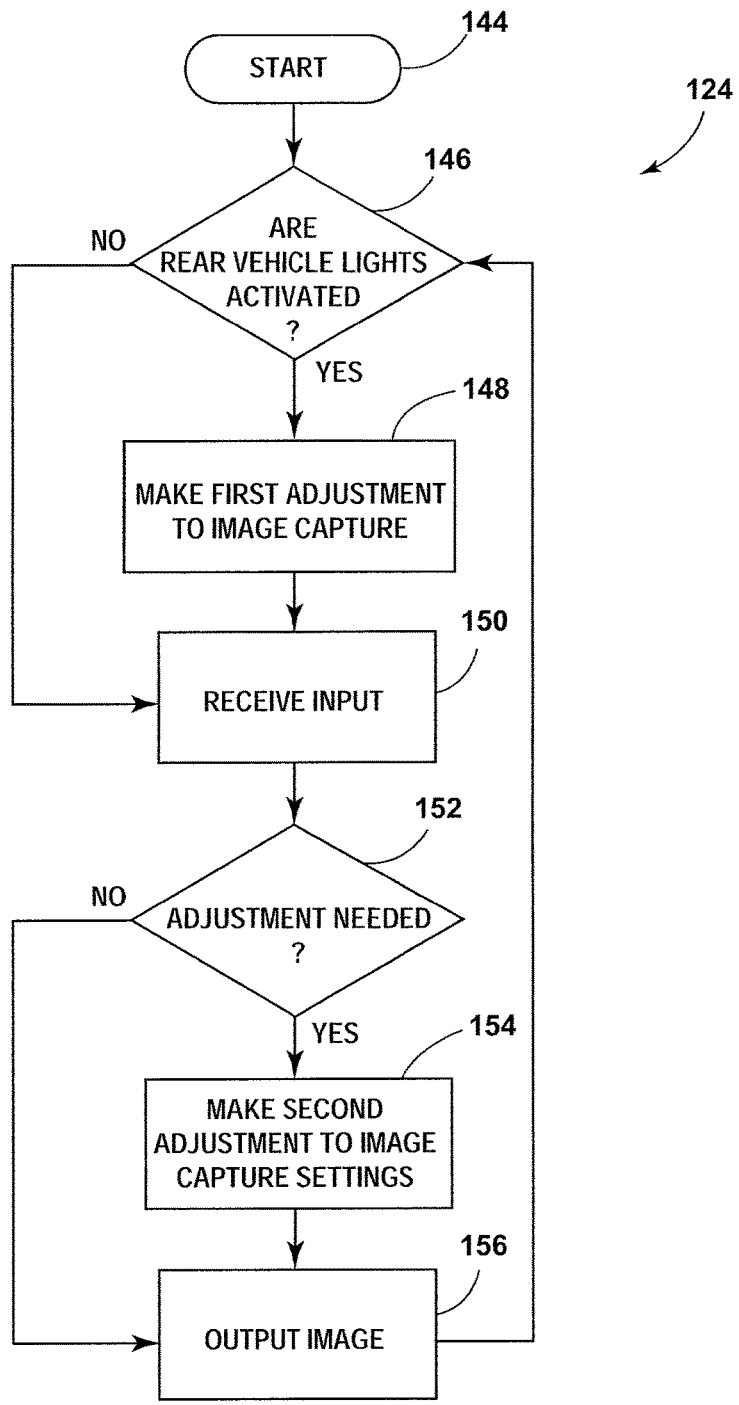
FIG. 6 is a flow chart of a routine for adjusting an image capture setting of a camera used in a trailer backup assist system, according to one embodiment.

Referring to FIG. 6, the routine 124 for adjusting the white balance and the exposure of the camera 22 is illustrated, according to one embodiment. The routine 124 begins at step 144 and proceeds to step 146 to check if any rear vehicle lights 138 have been activated. As described previously, this can be accomplished by providing the controller 118 with status information related to the activation state of each rear vehicle light 138, such as the brake light 82. If one or more rear vehicle lights 138 have been activated, the routine 124 proceeds to step 148 and the controller 118 makes a first adjustment to the image capture settings of the camera 22. In one embodiment, the controller 118 subtracts the color cast projected from the activated rear vehicle lights 138 from the captured image. Additionally or alternatively, the controller 118 compensates for the intensity associated with the activated rear vehicle lights 138 by either modifying the exposure of each pixel or by compensating a captured image.

Once step 148 is satisfied, or if no rear vehicle lights 138 have been activated (step 146), the routine 124 proceeds to step 150 and the controller 118 receives one or more types of input. As described previously herein, the input can include image data provided from the camera 22, locational input provided from the GPS enabled device 142 and GPS receiver 134, time and date information provided from the time and date input 126, weather information provided from the weather input 128, various inputs provided from one or more vehicle equipment 130, and sun tracking information provided by the sun tracking application 132. The routine 124 then proceeds to step 152 and the controller 118 determines whether or not to make a second adjustment to the image capture settings of the camera 22. In making such a determination, the controller 118 may use some or all of the abovementioned inputs. If the controller 118 decides that no adjustment is needed, the routine 124 outputs an image at step 156. Alternatively, if the controller 118 decides an adjustment is needed, the routine 124 proceeds to step 154 and the controller 118 makes the second adjustment, which can include adjusting the white balance and/or exposure of the camera 22. Following the second adjustment, the routine 124 outputs the adjusted image at step 156.

Figure 7:
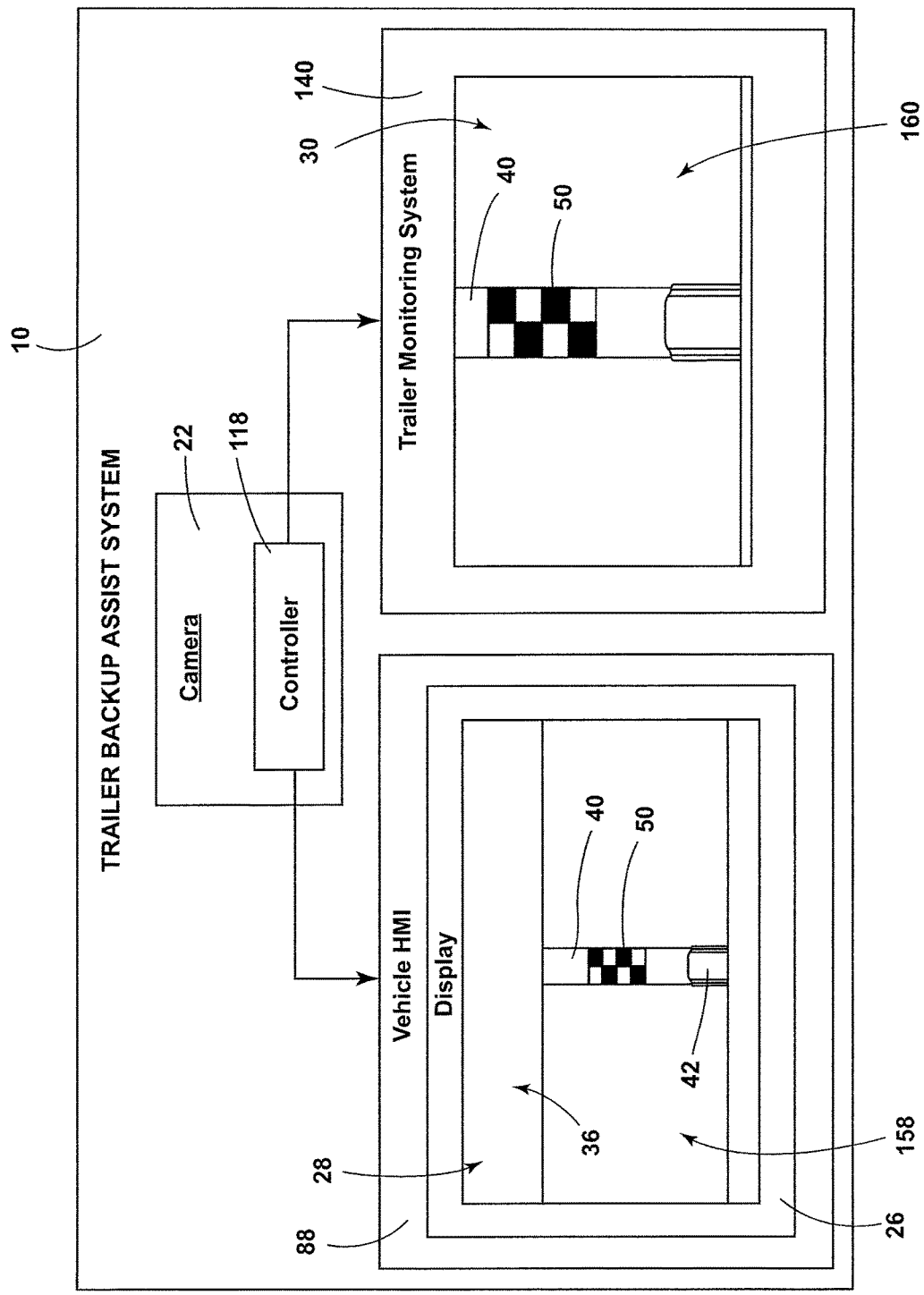
FIG. 7 is a block diagram of the trailer backup assist system, according to one embodiment, having a first portion of images from the camera displaying within the vehicle and a second portion of images analyzed within the trailer monitoring system.

Referring to FIG. 7, the trailer backup assist system 10 for a vehicle 14 is shown, according to one embodiment. The controller is configured to separate sequential images captured by the camera 22. A first portion of images 28 may then be supplied to the display 26 and a second portion of images 30 is supplied to a vehicle system independently, such as the trailer monitoring system 32. According to one embodiment, the first portion of images 28 includes the first captured image and every other image thereafter. The first portion of images 28 may be displayed on the display 26. The second portion of images 30 includes the second captured image and every other image thereafter. The second portion of images 30 may be stored and/or further analyzed by the trailer monitoring system 32. It will be appreciated, however, that any vehicle system may process any of the image data. Further, it will also be appreciated that the vehicle 14 may separate the images in any pattern to any number of portions and may supply that separated data to any number of systems within the vehicle 14.

The trailer monitoring system 32 may be a part of or otherwise utilized in conjunction with a trailer backup assist system 10. For purposes of illustration, the trailer monitoring system 32 is described herein as being adapted for use in the vehicle 14 shown in FIG. 1 and implemented using certain features of the trailer backup assist system 10 shown in FIGS. 1 and 2. However, it should be appreciated that the trailer monitoring system 32 may be implemented with only features that are exclusive thereto in other embodiments. It should also be appreciated that some features of the trailer backup assist system 10 have been omitted for clarity and the trailer monitoring system 32 is not necessarily reliant on any particular embodiment of the trailer backup assist system 10.

Figure 8:
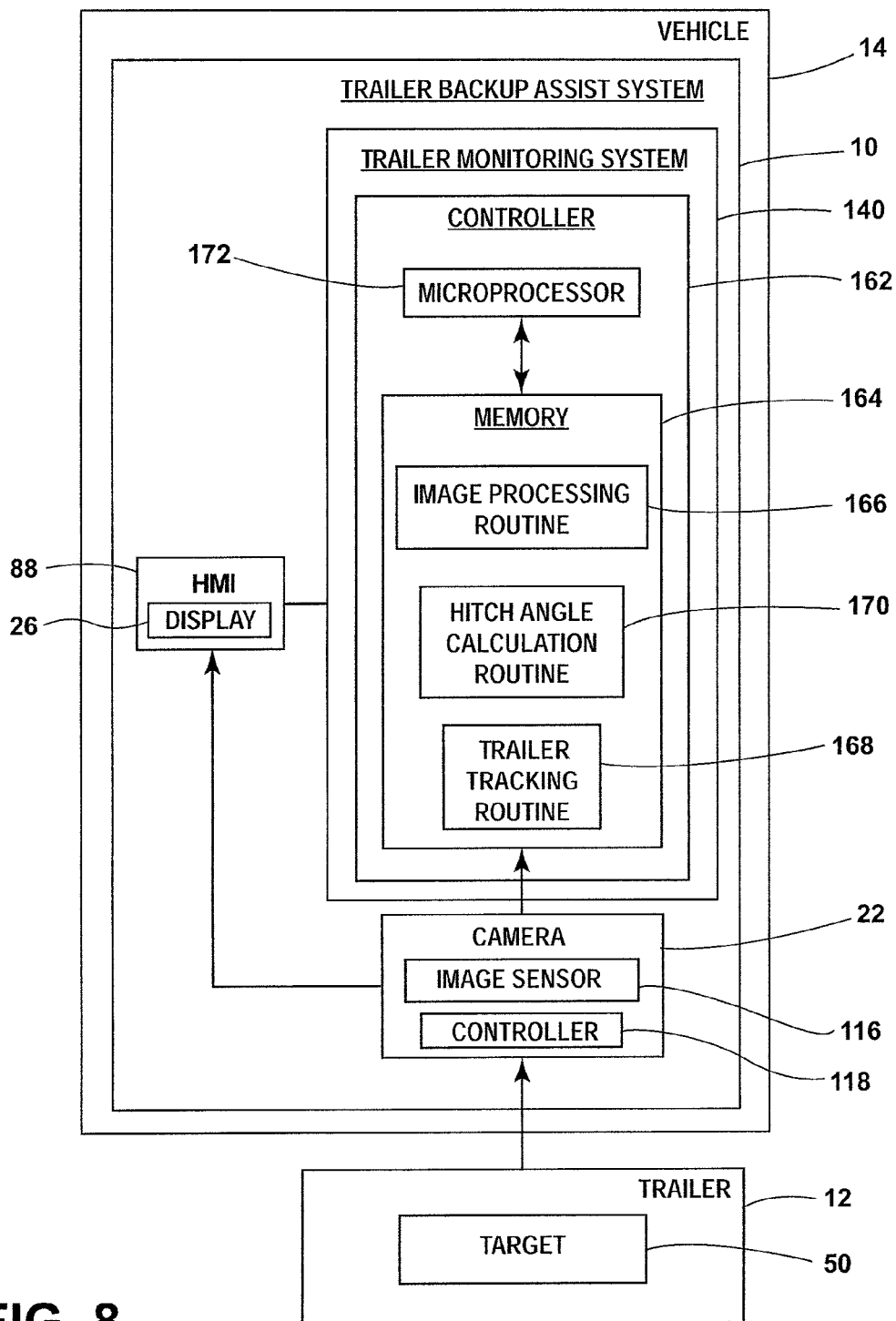
FIG. 8 is a block diagram illustrating one embodiment of a trailer monitoring system for use with the trailer backup assist system shown in FIGS. 1 and 2.

As shown in FIG. 8, the trailer monitoring system 32 is communicatively coupled to the camera 22 and/or a separate controller. Accordingly, the trailer monitoring system 32 may include a controller 162 that may correspond to controller 74 described previously herein or a separate stand-alone controller communicatively coupled to controller 74 and/or other control functions of the trailer backup assist system 10. Controller 162 may include memory 164 for storing one or more routines including the image processing routine 166, a trailer tracking routine 168, and a hitch angle calculation routine 170. The controller 162 may also include a microprocessor 172 and/or other analog and/or digital circuitry for processing the routines 166, 168, 170.

In operation, camera 22 is configured to image a scene rearward of the vehicle 14 and containing target 50, which is disposed on a trailer 12 attached to the vehicle 14. The target 50 is typically an identifiable visual target 50 that can be captured in an image by the camera 22 and detected and processed via image processing. As described previously herein, camera 22 may be embodied as a video imaging camera that repeatedly captures successive images (i.e., frames) of the scene. The first portion of images 28 may be displayed. The second portion of images 30 is supplied to the controller 162 to be processed with the image processing routine 166 to identify the target 50 and its location on the trailer 12. Once the target 50 has been identified, the hitch angle γ can be determined with the hitch angle calculation routine 170. For example, the hitch angle calculation routine 170 may determine the hitch angle γ by assessing characteristics of the target 50 such as, but not limited to, the location and/or orientation of the target 50 within the image. Additionally, the location and/or orientation of the target 50 may be tracked in successive images with the trailer tracking routine 168 to determine additional trailer related information such as, but not limited to, the rate of change of the hitch angle γ.

Each image from an image sensor 116 is received within the controller of the camera 22. Then, depending on the settings, user preference, and/or image pattern, the image is sent either to the display 26 or to the trailer monitoring system 32. In one embodiment, the camera processor sends every other image to display 26 and every other image to image processing routine 166. In a system using an image sensor 116 that operates at sixty images per second, this means that the display 26 can still receive images at 30 images per second. The vehicle camera 22 can provide various image rates. Some applications use video streaming at or above thirty fps, however, the technique herein can also be applied for lower image rates. The second portion of images 30 that are sent to the trailer monitoring system 32 may be used to analyze the movement of the target 50 and may be concealed from an occupant of the vehicle 14 and may be done every third image, fourth image, or even less. For example, a camera 22 running at 30 images per second may use 6 images per second to process the direction and movement of the trailer target 50 thereby leaving 24 images per second for the display 26.

The ratio of images sent to the display 26 and the trailer monitoring system 32 can be adjusted to optimize each process for performance and/or user experience. According to one embodiment, the ratio of images sent to the display 26 versus the trailer monitoring system 32 may differ for the initial adjustment (e.g., every other image is processed), as compared to subsequent adjustments.

The second portion of images 30 that may be sent to the trailer monitoring system 32 are measured and quantified according to various metrics, as previously described herein. As described above, the image processing routine may also conduct color processing and compression. In other embodiments, other analysis may be added to the image processing routine and the routines shown in FIG. 7 may be omitted or the order in which the routines are executed may be rearranged. According to one embodiment, the second portion of images 30 that are sent to image processing can be analyzed by color processing. Based on the results of color processing, signals are sent to the camera 22 to set chip level channel biases, gain voltages and other chip level settings to correct for image quality of subsequent images. Color processing may also update the image on the display 26 based on the results thereof.

Figure 9:
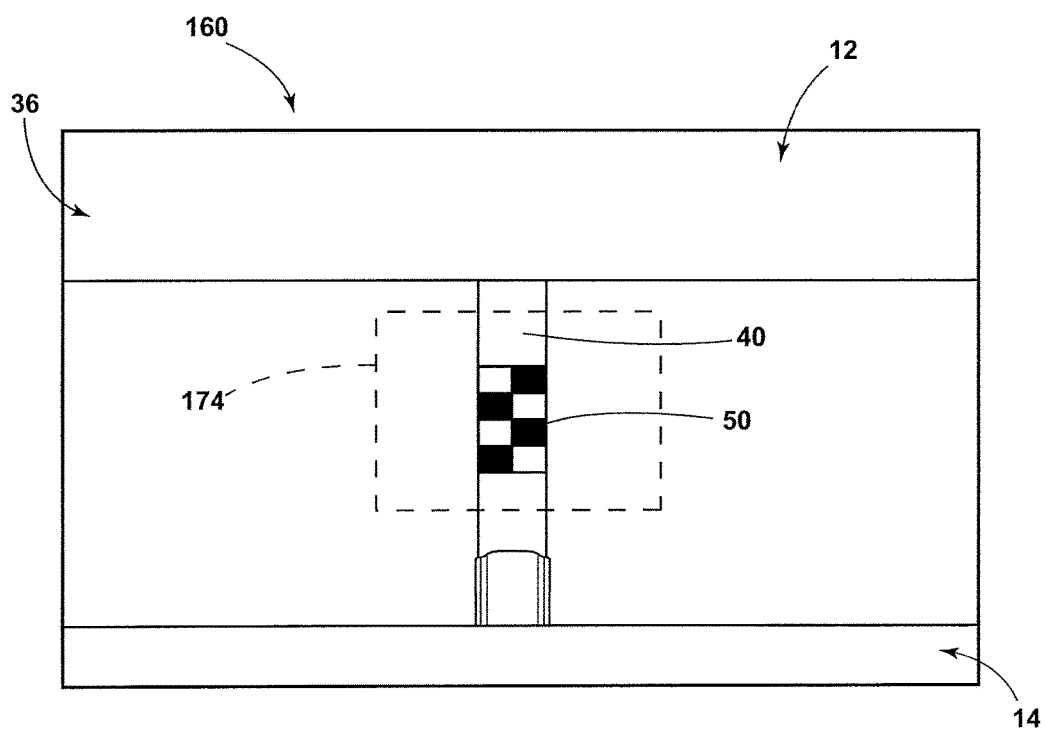
FIG. 9 is an example of an image captured by a camera of the trailer monitoring system of FIG. 8.

An example of an image 160 captured by camera 22 and disposed in the second portion of images 30 for analyzation by a vehicle system, such as the trailer monitoring system 32, is shown in FIG. 9. The image 160 contains the target 50, which is disposed on the tongue 40 of the trailer 12. In other trailer 12 embodiments, the target 50 may be located elsewhere. Given the numerous available vehicle 14 and trailer 12 configurations, it is generally more practical for a user (e.g., the vehicle operator) to select a trailer location on which to place the target 50. Preferably, the target 50 is positioned on the trailer 12 in a designated target placement zone 174 that is optimized for image capture. The target placement zone 174 may be generated by the controller 162 and shown to a user on a display 26 of the vehicle 14. The controller 162 may determine the target placement zone 174 based on information related to the camera 22, the vehicle 14, and/or the trailer 12. Additional information regarding target placement and target monitoring can be found in U.S. patent application Ser. No. 14/068,431, entitled "METHOD AND SYSTEM FOR MONITORING PLACEMENT OF A TARGET ON A TRAILER," filed Oct. 31, 2014, the entire disclosure of which is incorporated herein by reference.

No matter where the target 50 is found on the trailer 12, the target 50 will generally occupy a lesser portion of the image 160 when located at greater distances from the camera 22. As a result, fewer pixels are available to represent the target 50, which may hinder the ability of the controller 162 to identify and track the target 50 so that an accurate hitch angle γ can be determined. Recognizing this, the controller 162 may send the first portion of images 28 received therefrom to the display 26 and the second portion of images 30 to the trailer monitoring system 32, as described herein. The trailer monitoring system 32 may be configured to selectively modify images captured by the camera 22 so that the target 50 occupies a larger portion of the total image within the trailer monitoring system 32. A target monitoring system method employing image modification may facilitate accurate target identification and tracking, thereby reducing errors in hitch angle γ calculation.

Figure 10:
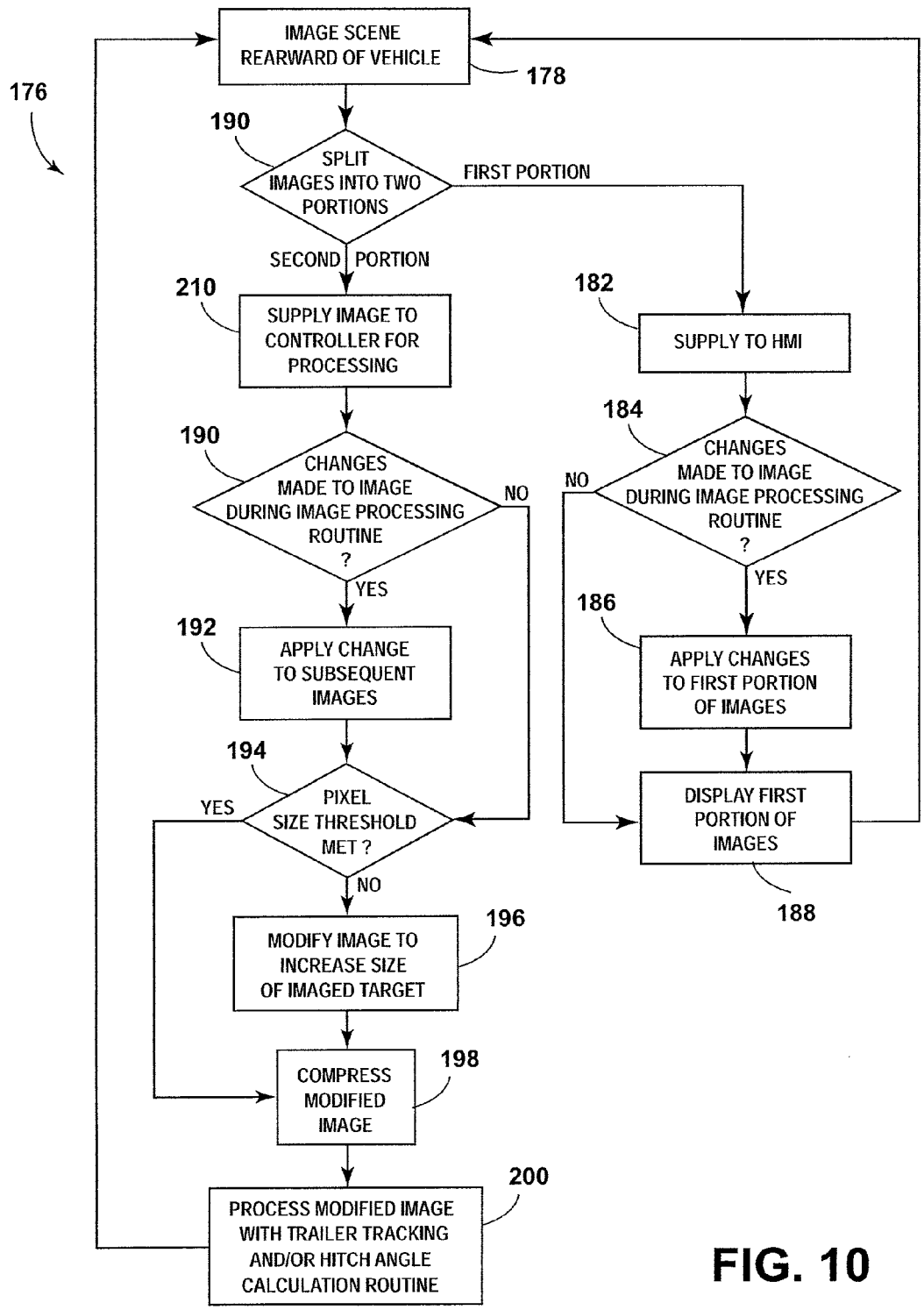
FIG. 10 is a flow diagram illustrating a trailer monitoring method according to one embodiment.

In FIG. 10, a flow diagram of a target monitoring method 176 is shown and is exemplarily described herein as being implemented using the trailer monitoring system 32 described above. At step 178, the camera 22 images a scene rearward of the vehicle 14. The resulting image (e.g., image 172) contains the environment rearwardly of the vehicle 14 and/or the target 50 disposed on the trailer 12 that may be attached to a vehicle 14. At step 190, the controller separates the images of the received image data based on a predefined sorting method. For example, every other image may be disposed in a first portion of images 28, or a first bin, and a second portion of images 30, or a second bin. However, any other sorting method may also be used. At step 182, if the image is placed in the first portion of images 28, the image is supplied to the HMI 88.

At step 210, if the image is separated into the second portion of images 30, the image is supplied to the controller for image processing. At step 190, the image process routine analyzes the image to determine if any adjustments need to be made to the image and/or the camera 22 based on the plurality of inputs described herein. If a change is necessary, the change is administered to the image and each subsequent image thereafter, at step 192. Simultaneously, if a change is necessary, the same image corrections are administered to the first portion of images 28 at step 186. The first portion of images 28 are then displayed on the display 26 within the vehicle 14, with the corrections, if necessary, at step 188.

Likewise, images in the second portion of images 30 are corrected at step 192, if any correction is necessary. At step 194, the controller 162 checks if the imaged target 50 meets a pixel size threshold. The pixel size threshold may correspond to the minimum pixel size of the imaged target 50 that allows for accurate detection and tracking of the target 50 and may vary depending on the specifications of the camera 22 and processing capabilities of the controller 162. In determining the pixel size threshold, various factors affecting target 50 detection may be considered such as, but not limited to, environmental conditions, lighting conditions, the like, or a combination thereof. If the imaged target 50 meets the pixel size threshold, the method 176 continues to step 198, which will be described further below. If the imaged target 50 does not meet the pixel size threshold, the controller 162 modifies the image to increase the image size of the target 50 relative to the total size of the captured image at step 196. In alternative embodiments, step 194 may be omitted in favor of always modifying the image regardless of the image size of the target 50.

Figure 11:
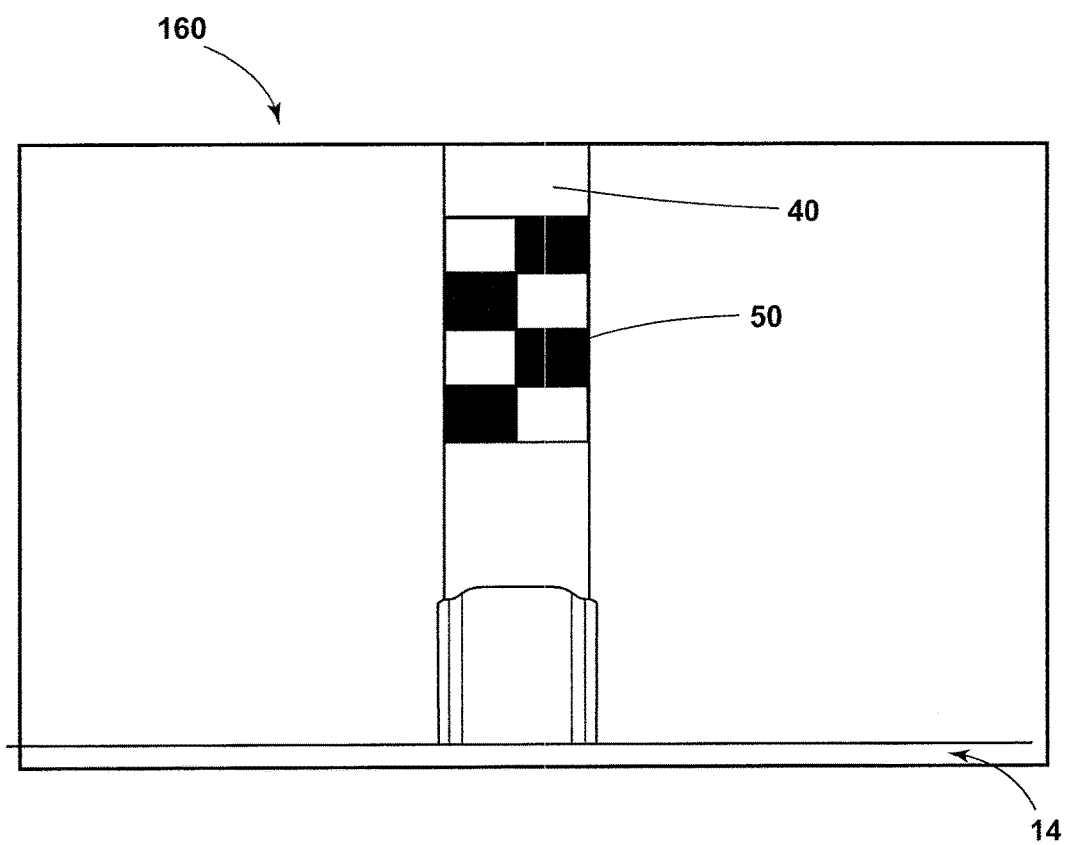
FIG. 11 shows a modified version of the captured image shown in FIG. 9.

For purposes of illustration, image 172 is shown modified in FIG. 11. Specifically, the modification includes cropping the original image 160 shown in FIG. 9 and centering the imaged target 50 therein. As a result, the imaged target 50 is substantially larger in the modified image 160 than it was in the original image 182. At step 198, the modified image may be compressed and stored to memory 164 of the controller 162 or otherwise processed at step 200 with the trailer tracking routine 168 and/or the hitch angle calculation routine 170. By compressing the modified image, more space is available in memory 164 for storing subsequent modified images and the modified images may be processed at higher rates by the trailer tracking routine 168 and/or the hitch angle calculation routine 170 at step 200. According to one embodiment, a modified image may be compressed from a 1 megapixel resolution to a 0.3 megapixel resolution. Since the imaged target 50 has a greater pixel size in the modified image, compression of the modified image does not generally degrade the image quality to an unacceptable level. At the completion of step 200 and/or 188, the method 176 may loop back to step 178 to capture another image that undergoes processing according to the steps outlined above. Accordingly, the display 26 within the vehicle displays a first image of a first size and the trailer monitoring system 32 monitors the processed image, which is not shown on the vehicle display 26, according to one embodiment.

Figure 12A:
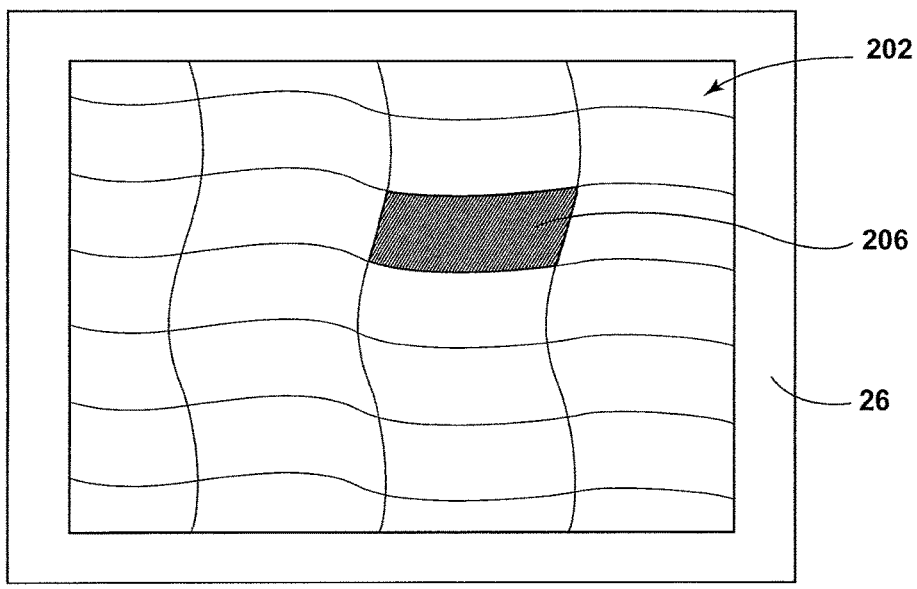
FIG. 12A is an exemplary first image displayed on the display within the vehicle for interlacing images through object motion estimation.
Figure 12B:
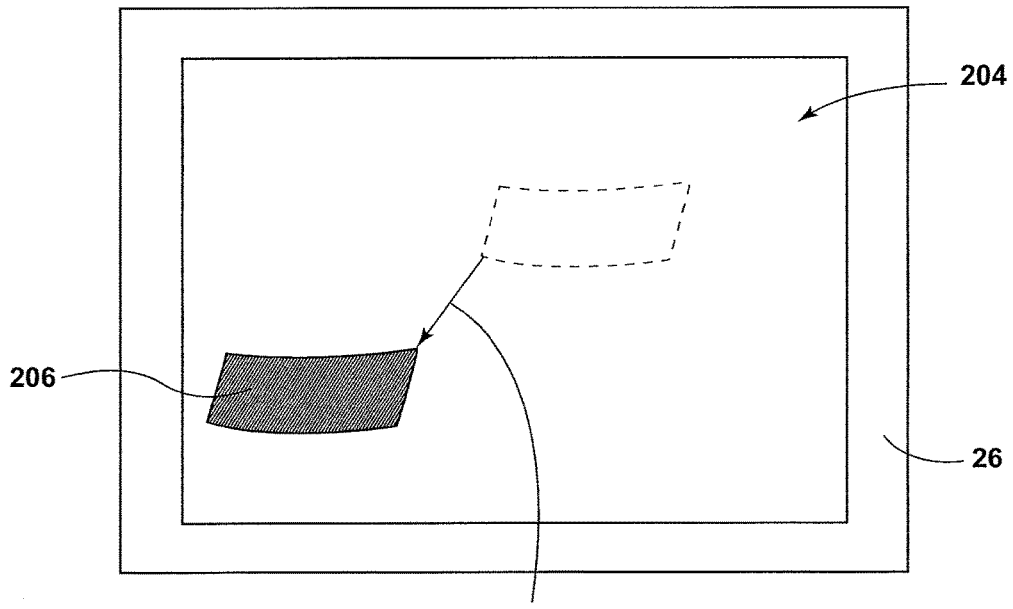
FIG. 12B is an exemplary second image displayed on the display within the vehicle illustrating the interlaced images through object motion estimation.

Referring to FIGS. 12A-12B, the controller may be configured to interlace consecutive images 202, 204 within the first portion of images 28 that are sent to the display 26 within the vehicle 14. Since the second image 204 within the first portion of images 28 is displayed later in time, the pixels hit in the second scan actually display an image that occurs slightly later in time than the image depicted by the first scan. In the case of a video sequence containing motion, such as when the vehicle 14 is in motion, the later of two images will display objects in different positions than in the previous field. Accordingly, interlaced images have the advantage of providing smoother motion since there are more incremental movements per second.

As illustrated in FIGS. 12A-12B, a process of interlacing consecutive images, or images, in illustrated by determining a motion vector, or estimating motion, for a segment in a segmented image. It will be appreciated, however, that any form of video interlacing may be used by the trailer backup assist system 10. As illustrated in FIG. 12A, image 202 is segmented into a plurality of segments, of which segment 206 is highlighted. As illustrated in FIG. 12A, image 204 occurs soon after image 202 in a video sequence, so it is likely to contain many of the same objects as image 202. Some objects, however, may have moved or deformed during the time elapsed between images 202 and 204. The pixels comprising segment 206 are compared to the corresponding set of pixels of same size and shape in a plurality of locations within image 204. For instance, typically a rectangular search area extending x pixels horizontally and y pixels vertically, centered on the location of segment in image 202, might be used. The location providing the best match to the pixel data in segment 204 is located. Motion vector 208 expresses the horizontal and vertical displacement between the original location of segment 206 in image 202 and the best matching new location in image 204. This process may be repeated for each segment in image 202 to determine a motion vector for each segment in image 204. A matching threshold may be used so that segments that fail to adequately match any location within image 202 are not assigned motion vectors at all. Any number of intermediate images may be interlaced between images from the camera 22 to produce any desired refresh rate.

More advanced motion estimation techniques may also take into account the rotation, sheer, contraction, expansion, or other deformation of segments between the two images. When these other parameters are allowed to vary in the search for a matching area in the later image, the motion vector expressing the best match for a segment will include not only horizontal and vertical displacement, but also information regarding rotation, sheer, contraction, expansion, and/or any other relevant deformation data that may assist in providing clearer motion on the display 26 of the first portion of images 28.

Accordingly, a trailer monitoring system and method have been advantageously provided herein for accurately detecting a target placed on a trailer. As a result, hitch angles and other trailer related information may be more accurately obtained. Such information may be used by a trailer backup assist system in aiding an operator of a vehicle in performing a trailer backing maneuver.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A vehicle backup assist system, comprising:
a camera generating images of a scene rearward of a vehicle and containing a target disposed on a trailer attached to the vehicle, wherein the camera is configured to separate a plurality of the images into a first portion or a second portion;
a display disposed within the vehicle and configured to display the first portion of images; and
a controller configured to analyze the second portion of images contemporaneously with the displaying of the first portion of images within the vehicle, adjust an image capture setting of the camera based on a status input, and modify each image in the second portion to increase a size of the imaged target relative to a total size of the captured scene to determine at least one trailer related information.

2. The vehicle backup assist system of claim 1, wherein the controller crops each image in the second portion about the imaged target to create a modified image.

3. The vehicle backup assist system of claim 2, wherein the imaged target is centered in the modified image.

4. The vehicle backup assist system of claim 1, wherein the controller is further configured to compress each modified image from a first resolution to a second resolution.

5. The vehicle backup assist system of claim 1, wherein the image capture setting includes at least one of a white balance and an exposure of the camera.

6. The vehicle backup assist system of claim 1, wherein the at least one trailer related information comprises at least one of a hitch angle and a change in hitch angle.

7. The vehicle backup assist system of claim 1, wherein the controller sets a reference point on one of the target and the trailer and analyzes image data with respect to the reference point to determine whether an adjustment to the image capture setting of the camera is needed.

8. A vehicle system, comprising:
a camera configured to image a vehicle rearward scene containing a trailer attached thereto, wherein the camera is configured to alternately distribute a plurality of images from the camera into independent first and second portions;
a display configured to display the first portion of images; and
a controller configured to receive the second portion of images and analyze the second portion of images to determine at least one vehicle related information.

9. The vehicle system of claim 8, wherein the trailer includes a target and the controller crops each image in the second portion about the imaged target.

10. The vehicle system of claim 8, wherein the controller is further configured to compress each image in the second portion from a first resolution to a second resolution.

11. The vehicle system of claim 10, wherein the first portion of images includes a first image and a second image and interlacing occurs between the first image and the second image prior to presentation on the display.

12. The vehicle system of claim 8, wherein the at least one vehicle related information is trailer related information and includes at least one of a hitch angle and a change in hitch angle.

13. The vehicle system of claim 8, wherein the controller is configured to adjust an image capture setting of the camera based on a status input from a vehicle lighting system, image data from the camera, and locational input from a positioning device.

14. A trailer backup assist method comprising the steps of:
generating images of imaging a scene rearward of a vehicle having a trailer attached thereto;
separating the images into a first portion and a second portion;
displaying the first portion of images on a display;
using a controller to set a reference point; and
analyzing the second portion of images with respect to the reference point to determine whether an adjustment to a camera image capture setting is needed.

15. The method of claim 14, wherein the trailer includes a target thereon that is viewable on the display in the first portion of images and processed in the second portion of images.

16. The method of claim 14, further comprising the step of:
modifying the second portion of images by cropping each image about the target.

17. The method of claim 14, further comprising the step of centering the imaged target within a modified image.

18. The method of claim 14, further comprising the step of compressing each modified image from a first resolution to a second resolution.

19. The method of claim 14, further comprising the step of interlacing between successive images within the first portion of images prior to placement on the display.

20. The method of claim 14, further comprising the step of applying the adjustment to the camera image capture setting to the first portion of images prior to displaying the first portion of images on the display.

* * * * *